(12) United States Patent
Chen

(10) Patent No.: US 10,645,717 B2
(45) Date of Patent: May 5, 2020

(54) MULTI-CELL UPLINK COORDINATED COMMUNICATION METHOD AND BASE STATION

(71) Applicant: HUAWEI TECHNOLOGIES CO., LTD., Shenzhen, Guangdong (CN)

(72) Inventor: Tuo Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 15/964,617

(22) Filed: Apr. 27, 2018

(65) Prior Publication Data

US 2018/0249483 A1 Aug. 30, 2018

Related U.S. Application Data

(63) Continuation of application No. PCT/CN2015/093256, filed on Oct. 29, 2015.

(51) Int. Cl.
*H04W 4/00* (2018.01)
*H04W 72/12* (2009.01)
(Continued)

(52) U.S. Cl.
CPC ....... *H04W 72/1231* (2013.01); *H04L 1/0026* (2013.01); *H04W 72/12* (2013.01);
(Continued)

(58) Field of Classification Search
None
See application file for complete search history.

(56) References Cited

U.S. PATENT DOCUMENTS

2012/0195284 A1 8/2012 Mann et al.
2014/0029584 A1 1/2014 Qu et al.
(Continued)

FOREIGN PATENT DOCUMENTS

CN 101873631 A 10/2010
CN 101932111 A 12/2010
(Continued)

OTHER PUBLICATIONS

XP031663710 Stefan Brueck et al., "Centralized Scheduling for Joint Transmission Coordinated Multi-Point in LTE-Advanced," 2010 International ITG Workshop on Smart Antennas (WSA 2010), pp. 177-184.
(Continued)

*Primary Examiner* — Elisabeth Benoit Magloire
(74) *Attorney, Agent, or Firm* — Kilpatrick Townsend & Stockton LLP

(57) ABSTRACT

Embodiments of the present invention provide a multi-cell uplink coordinated communication method and a base station. The method includes: A first base station predicts retransmission scheduling information or new transmission scheduling information for UE, and sends the retransmission scheduling information or the new transmission scheduling information to a second base station having a large exchange latency, so that a cell of the second base station serves as a coordinating cell to perform joint data receiving. Alternatively, a second base station having a large latency in exchange with a first base station buffers air interface data that is within fixed duration before any moment, so that the second base station having a large exchange latency may obtain corresponding air interface data according to scheduling information, to perform joint data receiving. Thus a problem that joint data receiving cannot be performed when an exchange latency between cells is large can be resolved.

20 Claims, 8 Drawing Sheets

(51) Int. Cl.
*H04L 1/00* (2006.01)
*H04W 28/16* (2009.01)
*H04L 1/20* (2006.01)
*H04W 72/04* (2009.01)

(52) U.S. Cl.
CPC ........... *H04W 72/1278* (2013.01); *H04L 1/20* (2013.01); *H04W 28/16* (2013.01); *H04W 72/0426* (2013.01)

(56) References Cited

U.S. PATENT DOCUMENTS

| | | | | |
|---|---|---|---|---|
| 2015/0264700 | A1* | 9/2015 | Li | H04L 25/0391 370/329 |
| 2016/0037550 | A1* | 2/2016 | Barabell | H04B 17/318 455/450 |
| 2016/0100423 | A1* | 4/2016 | Pengoria | H04B 7/024 370/329 |
| 2016/0330659 | A1* | 11/2016 | Zhu | H04W 36/0061 |
| 2017/0012751 | A1* | 1/2017 | Leroux | H04L 5/0035 |
| 2017/0373728 | A1* | 12/2017 | Viering | H04B 7/024 |

FOREIGN PATENT DOCUMENTS

| | | |
|---|---|---|
| CN | 104284437 A | 1/2015 |
| EP | 2489220 | 8/2012 |
| WO | 2014139588 A1 | 9/2014 |

OTHER PUBLICATIONS

XP050717546, R1-134421, LG Electronics, "Signaling design considerations for inter-eNB Operation in downlink CoMP," 3GPP TSG RAN WG1 Meeting #74bis, Guangzhou, China, Oct. 7-11, 2013 (6 pp.).

International Search Report dated Jul. 19, 2016 in corresponding International Patent Application No. PCT/CN2015/093256.

International Search Report, dated Jul. 19, 2016, in International Application No. PCT/CN2015/093256 (4 pp.).

Written Opinion of the International Searching Authority, dated Jul. 19, 2016, in International Application No. PCT/CN2015/093256 (7 pp.).

* cited by examiner

MULTI-CELL UPLINK COORDINATED COMMUNICATION METHOD AND BASE STATION

CROSS-REFERENCE TO RELATED APPLICATIONS

This application is a continuation of International Application No. PCT/CN2015/093256, filed on Oct. 29, 2015, the disclosure of which is hereby incorporated by reference in its entirety.

TECHNICAL FIELD

The present invention relates to the communications field, and in particular, to a multi-cell uplink coordinated communication method and a base station.

BACKGROUND

In an uplink coordinated multipoint transmission (CoMP) technology, multiple intra-base station cells or multiple inter-base station cells are used to jointly receive and decode uplink data of user equipment (UE), to increase an uplink rate of the UE.

Specifically, uplink data of UE may be received by multiple cells. The uplink data is received by means of exchange between the cells, so as to implement joint data receiving by the multiple cells, and increase an uplink rate of a user. For example, it is assumed that a serving cell of the UE is a cell 0, coordinating cells of the UE are cells 1 to K, and transmission channels for data exchange exist between the cell 0 and the cells 1 to K. When the UE performs an uplink service, the cell 0 receives uplink data sent by the UE, and the cells 1 to K also receive the uplink data sent by the UE. The cells 1 to K send, to the cell 0 by using the transmission channels, the uplink data received by the cells 1 to K, and the cell 0 jointly receives the uplink data received by the cell 0 from the UE and the uplink data received by the cell 0 from the cells 1 to K, to perform joint demodulation and decoding to determine whether the uplink data is correctly received.

However, the uplink data of the UE needs to be received and decoded within a specified time. Therefore, a strict requirement is imposed on a data exchange latency between the cells. Once the data sent by the coordinating cell to the serving cell cannot arrive in time, the serving cell cannot jointly receive the uplink data within a specified time for joint demodulation and decoding. Consequently, when joint data receiving cannot be performed when an exchange latency between the cells is large, the uplink rate of the user cannot be increased.

SUMMARY

Embodiments of the present invention provide a multi-cell uplink coordinated communication method and a base station, and can resolve a problem that joint data receiving cannot be performed when an exchange latency between cells is large.

According to a first aspect, a multi-cell uplink coordinated communication method is provided, where the method includes:

obtaining, by a first base station, new transmission scheduling information for user equipment UE to newly transmit first data at a current scheduling moment, where the first base station is a base station to which a serving cell of the UE belongs;

determining, by the first base station, that an exchange latency between the first base station and a second base station is greater than or equal to a first threshold and less than or equal to a second threshold;

obtaining, by the first base station, retransmission scheduling information that is for the UE to retransmit the first data; and sending, by the first base station, the retransmission scheduling information to the second base station, where the second base station is a base station to which a coordinating cell of the UE belongs.

With reference to the first aspect, in a first possible implementation of the first aspect, the retransmission scheduling information includes time domain information, frequency domain information, a redundancy version number, data retransmission indication information, and a modulation and coding scheme; and the time domain information in the retransmission scheduling information is obtained according to the following formula:

$$T = Tr \times \left\lceil \frac{Te - Ts}{Tr} \right\rceil + T0 + Ts,$$

where T represents the time domain information in the retransmission scheduling information, T0 represents the current scheduling moment, Te represents the exchange latency, Tr represents a preset time interval for the UE to retransmit the first data, and Ts represents a time interval from a time when the first base station completes scheduling to a time when the UE starts to send the first data.

With reference to the first aspect or the first possible implementation of the first aspect, in a second possible implementation of the first aspect, the method further includes:

receiving, by the first base station, source bit data obtained after the second base station correctly decodes the first data retransmitted by the UE, and performing packaging according to the source bit data; or receiving, by the first base station, first bit data obtained when the second base station does not complete decoding of the first data retransmitted by the UE, and merging, for joint demodulation and decoding, the first bit data and second bit data that is of a same type as the first bit data and that is obtained by the first base station in a process of decoding the first data.

Therefore, an embodiment of the present invention provides the multi-cell uplink coordination method, applied to the first base station and the second base station. The first base station is the base station to which the serving cell of the UE belongs, and the second base station is the base station to which the coordinating cell of the UE belongs. The first base station obtains the new transmission scheduling information for the UE to newly transmit the first data at the current scheduling moment, determines that the exchange latency between the first base station and the second base station is greater than or equal to the first threshold and less than or equal to the second threshold, obtains the retransmission scheduling information that is for the UE to retransmit the first data, and sends the retransmission scheduling information to the second base station. The coordinating cell of the UE is in a coverage area of the second base station.

In this way, when the UE retransmits the first data, the second base station may learn, in time, of a time-frequency resource on which the first data is located. Therefore, when a latency between the cells is relatively large, the first base station and the second base station can perform joint data receiving when the UE performs retransmission, to perform joint demodulation and decoding to increase an uplink rate of a user.

According to a second aspect, a multi-cell uplink coordinated communication method is provided, where the method includes:

receiving, by a second base station, retransmission scheduling information that is sent by a first base station and that is for first user equipment UE to retransmit first data, where an exchange latency between the second base station and the first base station is greater than or equal to a first threshold and less than or equal to a second threshold, the first base station is a base station to which a serving cell of the UE belongs, and the second base station is a base station to which a coordinating cell of the UE belongs;

receiving, by the second base station, the first data retransmitted by the first UE; and decoding, by the second base station, the first data according to the retransmission scheduling information.

With reference to the second aspect, in a first possible implementation of the second aspect, before the decoding, by the second base station, the first data according to the retransmission scheduling information, the method further includes:

if the second base station determines, according to time domain information in the retransmission scheduling information, that there is second UE to be scheduled in a subframe corresponding to the time domain information, and the second UE causes interference to the first UE, skipping, by the second base station, scheduling the second UE at a location of the subframe.

With reference to the second aspect or the first possible implementation of the second aspect, in a second possible implementation of the second aspect, the method further includes:

sending, by the second base station, source bit data obtained after correct decoding to the first base station; or sending, by the second base station, bit data obtained when decoding is not completed to the first base station.

Therefore, an embodiment of the present invention provides the multi-cell uplink coordination method, applied to the first base station and the second base station. The first base station is the base station to which the serving cell of the UE belongs, and the second base station is the base station to which the coordinating cell of the UE belongs. The second base station receives the retransmission scheduling information that is sent by the first base station and that is for the first UE to retransmit the first data. The exchange latency between the second base station and the first base station is greater than or equal to the first threshold and less than or equal to the second threshold. The second base station receives the first data retransmitted by the first UE. The second base station decodes the first data according to the retransmission scheduling information. In this way, when a latency between the cells is relatively large, and when the UE retransmits the first data, the second base station may learn, in time, of a time-frequency resource on which the first data is located, so that the first base station and the second base station can perform joint data receiving when the UE performs retransmission, to perform joint demodulation and decoding to increase an uplink rate of a user.

According to a third aspect, a multi-cell uplink coordinated communication method is provided, where the method includes:

obtaining, by a first base station, a service type of user equipment UE during scheduling of the UE, and predicting, according to the service type, whether the UE has data to be sent, where the first base station is a base station to which a serving cell of the UE belongs; and if the first base station predicts that the UE has data to be sent, obtaining, by the first base station at a current scheduling moment, scheduling information at an $n^{th}$ scheduling moment, where a preset time interval exists between the current scheduling moment and the $n^{th}$ scheduling moment, and the scheduling information does not occupy a time-frequency resource of the first base station at the current scheduling moment; and sending the scheduling information at the $n^{th}$ scheduling moment to a second base station, where the second base station is a base station to which a coordinating cell of the UE belongs.

With reference to the third aspect, in a first possible implementation of the third aspect, the method further includes:

when a first scheduling moment corresponding to a subframe in the scheduling information arrives, preferentially allocating a time-frequency resource at the first scheduling moment to the UE.

With reference to the third aspect or the first possible implementation of the third aspect, in a third possible implementation of the third aspect, the method further includes:

receiving, by the first base station, source bit data obtained after the second base station correctly decodes first data, and performing packaging according to the source bit data; or receiving, by the first base station, first bit data obtained when the second base station does not complete decoding of first data, and merging, for joint demodulation and decoding, the first bit data and second bit data that is of a same type as the first bit data and that is obtained by the first base station in a process of decoding the uplink data.

Therefore, an embodiment of the present invention provides the multi-cell uplink coordination method, applied to the first base station and the second base station. The first base station is the base station to which the serving cell of the UE belongs, and the second base station is the base station to which the coordinating cell of the UE belongs. The first base station obtains the service type of the user equipment UE during scheduling of the UE, and predicts, according to the service type, whether the UE has data to be sent after a time period. If the first base station predicts that the UE has data to be sent, the first base station obtains, at the current scheduling moment, the scheduling information at the $n^{th}$ scheduling moment, where the preset time interval exists between the current scheduling moment and the $n^{th}$ scheduling moment, and the scheduling information does not occupy the time-frequency resource of the first base station at the current scheduling moment; and sends the scheduling information at the $n^{th}$ scheduling moment to the second base station. In this way, the coordinating cell can save, before the $n^{th}$ scheduling moment arrives, the scheduling information at the $n^{th}$ scheduling moment, and receive, in time according to the scheduling information that is at the $n^{th}$ scheduling moment and that is predicted by the serving cell in advance, the first data that is at the $n^{th}$ scheduling moment and that is sent by a user. Therefore, when an exchange latency is large, the coordinating cell can receive, according to the scheduling information obtained in time, the data sent by the UE, so that the serving cell and the coordinating cell can perform joint data receiving for joint demodulation and decoding, to increase an uplink rate of the user.

According to a fourth aspect, a multi-cell uplink coordinated communication method is provided, where the method includes:

receiving, by a second base station, scheduling information that is at an $n^{th}$ scheduling moment and that is obtained by a first base station at a current scheduling moment, where a preset time interval exists between the current scheduling moment and the $n^{th}$ scheduling moment, and the scheduling information does not occupy a time-frequency resource of the first base station at the current scheduling moment; and decoding, by the second base station according to the scheduling information at the $n^{th}$ scheduling moment, first data that is at the $n^{th}$ scheduling moment and that is sent by first user equipment UE, where the first base station is a base station to which a serving cell of the UE belongs, and the second base station is a base station to which a coordinating cell of the UE belongs.

With reference to the fourth aspect, in a first possible implementation of the fourth aspect, before the decoding, by the second base station according to the scheduling information at the $n^{th}$ scheduling moment, first data that is at the $n^{th}$ scheduling moment and that is sent by first user equipment UE, the method further includes:

if the second base station determines, according to time domain information in the scheduling information at the $n^{th}$ scheduling moment, that there is second UE to be scheduled in a subframe corresponding to the time domain information, and the second UE causes interference to the first UE, skipping, by the second base station, scheduling the second UE at a location of the subframe.

With reference to the fourth aspect or the first possible implementation of the fourth aspect, in a second possible implementation of the fourth aspect, the method further includes:

sending, by the second base station, source bit data obtained after correct decoding to the first base station; or sending, by the second base station, bit data obtained when decoding is not completed to the first base station.

Therefore, an embodiment of the present invention provides the multi-cell uplink coordination method, applied to the first base station and the second base station. The first base station is the base station to which the serving cell of the UE belongs, and the second base station is the base station to which the coordinating cell of the UE belongs. The second base station receives the scheduling information that is at the $n^{th}$ scheduling moment and that is obtained by the first base station at the current scheduling moment, where the preset time interval exists between the current scheduling moment and the $n^{th}$ scheduling moment, and the scheduling information does not occupy the time-frequency resource of the first base station at the current scheduling moment. The second base station decodes, according to the scheduling information at the $n^{th}$ scheduling moment, the first data that is at the $n^{th}$ scheduling moment and that is sent by the first user equipment UE. In this way, the coordinating cell can save, before the $n^{th}$ scheduling moment arrives, the scheduling information at the $n^{th}$ scheduling moment, and receive, in time according to the scheduling information that is at the $n^{th}$ scheduling moment and that is predicted by the serving cell in advance, the first data that is at the $n^{th}$ scheduling moment and that is sent by a user. Therefore, when an exchange latency is large, the coordinating cell can receive, according to the scheduling information obtained in time, the data sent by the UE, so that the serving cell and the coordinating cell can perform joint data receiving for joint demodulation and decoding, to increase an uplink rate of the user.

According to a fifth aspect, a multi-cell uplink coordinated communication method is provided, where the method includes:

when a second base station determines an exchange latency between the second base station and a first base station, if the exchange latency is greater than a first threshold and less than a second threshold, when receiving, at any moment, air interface data sent by user equipment UE, buffering, by the second base station, air interface data that is within fixed duration before the any moment, where a serving cell of the UE is in a coverage area of the first base station, a coordinating cell of the UE is in a coverage area of the second base station, and the fixed duration is greater than a sum of the exchange latency plus a preset value;

when the second base station receives scheduling information sent by the first base station, determining, by the second base station, whether air interface data corresponding to the scheduling information is buffered; and decoding the air interface data corresponding to the scheduling information if the second base station determines that the air interface data corresponding to the scheduling information is buffered.

With reference to the fifth aspect, in a first possible implementation of the fifth aspect, the determining, by the second base station, whether air interface data corresponding to the scheduling information is buffered; and decoding the air interface data corresponding to the scheduling information if the second base station determines that the air interface data corresponding to the scheduling information is buffered includes:

determining, by the second base station according to a frame number and a subframe number that are corresponding to time domain information in the scheduling information, whether air interface data corresponding to the frame number and the subframe number is buffered; and decoding the air interface data corresponding to the frame number and the subframe number if the second base station determines that the air interface data corresponding to the frame number and the subframe number is buffered.

With reference to the fifth aspect or the first possible implementation of the fifth aspect, in a second possible implementation of the fifth aspect, the method further includes:

sending, by the second base station, source bit data obtained after correct decoding to the first base station; or sending, by the second base station, bit data obtained when decoding is not completed to the first base station.

Therefore, an embodiment of the present invention provides the multi-cell uplink coordination method, applied to the first base station and the second base station. The serving cell of the UE is in the coverage area of the first base station, and the coordinating cell of the UE is in the coverage area of the second base station. When the second base station determines the exchange latency between the second base station and the first base station, if the exchange latency is greater than the first threshold and less than the second threshold, when receiving, at any moment, the air interface data sent by the UE, the second base station buffers the air interface data that is within the fixed duration before the any moment. When the second base station receives the scheduling information sent by the first base station, the second base station determines whether the air interface data corresponding to the scheduling information is buffered, and decodes the air interface data corresponding to the scheduling information if the second base station determines that the air interface data corresponding to the scheduling information is buffered. In this way, the coordinating cell having a relatively large latency in exchange with the serving cell may buffer the received air interface data, so that for scheduling information that arrives at the coordinating cell later than the air interface data, the coordinating cell can receive uplink data of the UE according to the air interface data and the scheduling information. Therefore, the serving cell and the coordinating cell can perform joint data receiving on the UE for joint demodulation and decoding, to increase an uplink rate of the UE.

According to a sixth aspect, a first base station is provided, including:

an obtaining unit, configured to obtain new transmission scheduling information for user equipment UE to newly transmit first data at a current scheduling moment, where the first base station is a base station to which a serving cell of the UE belongs;

a determining unit, configured to determine that an exchange latency between the first base station and a second base station is greater than or equal to a first threshold and less than or equal to a second threshold, where the obtaining unit is further configured to obtain retransmission scheduling information that is for the UE to retransmit the first data; and a sending unit, configured to send the retransmission scheduling information to the second base station, where the second base station is a base station to which a coordinating cell of the UE belongs.

With reference to the sixth aspect, in a first possible implementation of the sixth aspect, the retransmission scheduling information includes time domain information, frequency domain information, a redundancy version number, data retransmission indication information, and a modulation and coding scheme; and the time domain information in the retransmission scheduling information is obtained according to the following formula:

$$T = Tr \times \left\lceil \frac{Te - Ts}{Tr} \right\rceil + T0 + Ts,$$

where T represents the time domain information in the retransmission scheduling information, T0 represents the current scheduling moment, Te represents the exchange latency, Tr represents a preset time interval for the UE to retransmit the first data, and Ts represents a time interval from a time when the first base station completes scheduling to a time when the UE starts to send the first data.

With reference to the sixth aspect or the first possible implementation of the sixth aspect, in a second possible implementation of the sixth aspect, the first base station further includes:

a receiving unit, configured to: receive source bit data obtained after the second base station correctly decodes the first data retransmitted by the UE, and perform packaging according to the source bit data; or receive first bit data obtained when the second base station does not complete decoding of the first data retransmitted by the UE, and merge, for joint demodulation and decoding, the first bit data and second bit data that is of a same type as the first bit data and that is obtained by the first base station in a process of decoding the first data.

According to a seventh aspect, a second base station is provided, including:

a receiving unit, configured to receive retransmission scheduling information that is sent by a first base station and that is for first user equipment UE to retransmit first data, where an exchange latency between the second base station and the first base station is greater than or equal to a first threshold and less than or equal to a second threshold, the first base station is a base station to which a serving cell of the UE belongs, and the second base station is a base station to which a coordinating cell of the UE belongs, where the receiving unit is further configured to receive the first data retransmitted by the first UE; and a processing unit, configured to decode the first data according to the retransmission scheduling information.

With reference to the seventh aspect, in a first possible implementation of the seventh aspect, the processing unit is further configured to:

if the processing unit determines, according to time domain information in the retransmission scheduling information, that there is second UE to be scheduled in a subframe corresponding to the time domain information, and the second UE causes interference to the first UE, skip scheduling the second UE at a location of the subframe.

With reference to the seventh aspect or the first possible implementation of the seventh aspect, in a second possible implementation of the seventh aspect, the second base station further includes:

a sending unit, configured to: send source bit data obtained after correct decoding to the first base station, or send bit data obtained when decoding is not completed to the first base station.

According to an eighth aspect, a first base station is provided, including:

an obtaining unit, configured to obtain a service type of user equipment UE during scheduling of the UE;

a determining unit, configured to predict, according to the service type, whether the UE has data to be sent, where the first base station is a base station to which a serving cell of the UE belongs; where the obtaining unit is further configured to: if it is predicted that the UE has data to be sent, obtain, at a current scheduling moment, scheduling information at an $n^{th}$ scheduling moment, where a preset time interval exists between the current scheduling moment and the $n^{th}$ scheduling moment, and the scheduling information does not occupy a time-frequency resource of the first base station at the current scheduling moment; and a sending unit, configured to send the scheduling information at the $n^{th}$ scheduling moment to a second base station, where the second base station is a base station to which a coordinating cell of the UE belongs.

With reference to the eighth aspect, in a first possible implementation of the eighth aspect, the first base station further includes:

a processing unit, configured to: when a first scheduling moment corresponding to a subframe in the scheduling information arrives, preferentially allocate a time-frequency resource at the first scheduling moment to the UE.

With reference to the eighth aspect or the first possible implementation of the eighth aspect, in a second possible implementation of the eighth aspect, the first base station further includes:

a receiving unit, configured to: receive source bit data obtained after the second base station correctly decodes first data, and perform packaging according to the source bit data; or receive first bit data obtained when the second base station does not complete decoding of first data, and merge, for joint demodulation and decoding, the first bit data and second bit data that is of a same type as the first bit data and that is obtained by the first base station in a process of decoding the uplink data.

According to a ninth aspect, a second base station is provided, including:

a receiving unit, configured to receive scheduling information that is at an $n^{th}$ scheduling moment and that is obtained by a first base station at a current scheduling moment, where a preset time interval exists between the current scheduling moment and the $n^{th}$ scheduling moment, and the scheduling information does not occupy a time-frequency resource of the first base station at the current scheduling moment; and a processing unit, configured to decode, according to the scheduling information at the $n^{th}$ scheduling moment, first data that is at the $n^{th}$ scheduling moment and that is sent by first user equipment UE, where the first base station is a base station to which a serving cell of the UE belongs, and the second base station is a base station to which a coordinating cell of the UE belongs.

With reference to the ninth aspect, in a first possible implementation of the ninth aspect, the processing unit is further configured to: if the second base station determines, according to time domain information in the scheduling information at the $n^{th}$ scheduling moment, that there is second UE to be scheduled in a subframe corresponding to the time domain information, and the second UE causes interference to the first UE, skip scheduling the second UE at a location of the subframe.

With reference to the ninth aspect or the first possible implementation of the ninth aspect, in a second possible implementation of the ninth aspect, the second base station further includes:

a sending unit, configured to: send source bit data obtained after correct decoding to the first base station, or send bit data obtained when decoding is not completed to the first base station.

According to a tenth aspect, a second base station is provided, including:

a buffering unit, configured to: when the second base station determines an exchange latency between the second base station and a first base station, if the exchange latency is greater than a first threshold and less than a second threshold, when receiving, at any moment, air interface data sent by user equipment UE, buffer air interface data that is within fixed duration before the any moment, where a serving cell of the UE is in a coverage area of the first base station, a coordinating cell of the UE is in a coverage area of the second base station, and the fixed duration is greater than a sum of the exchange latency plus a preset value;

a determining unit, configured to: when the second base station receives scheduling information sent by the first base station, determine whether air interface data corresponding to the scheduling information is buffered; and a processing unit, configured to decode the air interface data corresponding to the scheduling information if the determining unit determines that the air interface data corresponding to the scheduling information is buffered.

With reference to the tenth aspect, in a first possible implementation of the tenth aspect, the determining unit is specifically configured to determine, according to a frame number and a subframe number that are corresponding to time domain information in the scheduling information, whether air interface data corresponding to the frame number and the subframe number is buffered; and the processing unit is specifically configured to decode the air interface data corresponding to the frame number and the subframe number if the determining unit determines that the air interface data corresponding to the frame number and the subframe number is buffered.

With reference to the tenth aspect or the first possible implementation of the tenth aspect, in a second possible implementation of the tenth aspect, the second base station further includes a sending unit, configured to: send source bit data obtained after correct decoding to the first base station, or send bit data obtained when decoding is not completed to the first base station.

According to an eleventh aspect, a first base station is provided, including:

a processor, configured to obtain new transmission scheduling information for user equipment UE to newly transmit first data at a current scheduling moment, where the first base station is a base station to which a serving cell of the UE belongs, where the processor is further configured to determine that an exchange latency between the first base station and a second base station is greater than or equal to a first threshold and less than or equal to a second threshold; and the processor is further configured to obtain retransmission scheduling information that is for the UE to retransmit the first data; and a transmitter, configured to send the retransmission scheduling information to the second base station, where the second base station is a base station to which a coordinating cell of the UE belongs.

With reference to the eleventh aspect, in a first possible implementation of the eleventh aspect, the retransmission scheduling information includes time domain information, frequency domain information, a redundancy version number, data retransmission indication information, and a modulation and coding scheme; and the time domain information in the retransmission scheduling information is obtained according to the following formula:

$$T = Tr \times \left\lceil \frac{Te - Ts}{Tr} \right\rceil + T0 + Ts,$$

where T represents the time domain information in the retransmission scheduling information, T0 represents the current scheduling moment, Te represents the exchange latency, Tr represents a preset time interval for the UE to retransmit the first data, and Ts represents a time interval from a time when the first base station completes scheduling to a time when the UE starts to send the first data.

With reference to the eleventh aspect or the first possible implementation of the eleventh aspect, in a second possible implementation of the eleventh aspect, the first base station further includes:

a receiver, configured to: receive source bit data obtained after the second base station correctly decodes the first data retransmitted by the UE, and perform packaging according to the source bit data; or receive first bit data obtained when the second base station does not complete decoding of the first data retransmitted by the UE, and merge, for joint demodulation and decoding, the first bit data and second bit data that is of a same type as the first bit data and that is obtained by the first base station in a process of decoding the first data.

According to a twelfth aspect, a second base station is provided, including:

a receiver, configured to receive retransmission scheduling information that is sent by a first base station and that is for first user equipment UE to retransmit first data, where an exchange latency between the second base station and the first base station is greater than or equal to a first threshold and less than or equal to a second threshold, the first base station is a base station to which a serving cell of the UE belongs, and the second base station is a base station to which a coordinating cell of the UE belongs, where the receiver is further configured to receive the first data retransmitted by the first UE; and a processor, configured to decode the first data according to the retransmission scheduling information.

With reference to the twelfth aspect, in a first possible implementation of the twelfth aspect, the processor is further configured to: if the second base station determines, according to time domain information in the retransmission scheduling information, that there is second UE to be scheduled in a subframe corresponding to the time domain information, and the second UE causes interference to the first UE, skip scheduling the second UE at a location of the subframe.

With reference to the twelfth aspect or the first possible implementation of the twelfth aspect, in a second possible implementation of the twelfth aspect, the second base station further includes:

a transmitter, configured to: send source bit data obtained after correct decoding to the first base station, or send bit data obtained when decoding is not completed to the first base station.

According to a thirteenth aspect, a first base station is provided, including:

a processor, configured to: obtain a service type of user equipment UE during scheduling of the UE, and predict, according to the service type, whether the UE has data to be sent, where the first base station is a base station to which a serving cell of the UE belongs, where the processor is further configured to: if the processor predicts that the UE has data to be sent, obtain, at a current scheduling moment, scheduling information at an $n^{th}$ scheduling moment, where a preset time interval exists between the current scheduling moment and the $n^{th}$ scheduling moment, and the scheduling information does not occupy a time-frequency resource of the first base station at the current scheduling moment; and a transmitter, configured to send the scheduling information at the $n^{th}$ scheduling moment to a second base station, where the second base station is a base station to which a coordinating cell of the UE belongs.

With reference to the thirteenth aspect, in a first possible implementation of the thirteenth aspect, the processor is further configured to: when a first scheduling moment corresponding to a subframe in the scheduling information arrives, preferentially allocate a time-frequency resource at the first scheduling moment to the UE.

With reference to the thirteenth aspect or the first possible implementation of the thirteenth aspect, in a second possible implementation of the thirteenth aspect, the first base station further includes a receiving unit, configured to: receive source bit data obtained after the second base station correctly decodes first data, and perform packaging according to the source bit data; or receive first bit data obtained when the second base station does not complete decoding of first data, and merge, for joint demodulation and decoding, the first bit data and second bit data that is of a same type as the first bit data and that is obtained by the first base station in a process of decoding the uplink data.

According to a fourteenth aspect, a second base station is provided, including:

a receiver, configured to receive scheduling information that is at an $n^{th}$ scheduling moment and that is obtained by a first base station at a current scheduling moment, where a preset time interval exists between the current scheduling moment and the $n^{th}$ scheduling moment, and the scheduling information does not occupy a time-frequency resource of the first base station at the current scheduling moment; and a processor, configured to decode, according to the scheduling information at the $n^{th}$ scheduling moment, first data that is at the $n^{th}$ scheduling moment and that is sent by first user equipment UE, where the first base station is a base station to which a serving cell of the UE belongs, and the second base station is a base station to which a coordinating cell of the UE belongs.

With reference to the fourteenth aspect, in a first possible implementation of the fourteenth aspect, the processor is further configured to: if the second base station determines, according to time domain information in the scheduling information at the $n^{th}$ scheduling moment, that there is second UE to be scheduled in a subframe corresponding to the time domain information, and the second UE causes interference to the first UE, skip scheduling the second UE at a location of the subframe.

With reference to the fourteenth aspect or the first possible implementation of the fourteenth aspect, in a second possible implementation of the fourteenth aspect, the second base station further includes:

a sending unit, configured to: send source bit data obtained after correct decoding to the first base station, or send bit data obtained when decoding is not completed to the first base station.

According to a fifteenth aspect, a second base station is provided, including:

a processor, configured to: when the second base station determines an exchange latency between the second base station and a first base station, if the exchange latency is greater than a first threshold and less than a second threshold, when receiving, at any moment, air interface data sent by user equipment UE, buffer air interface data that is within fixed duration before the any moment, where a serving cell of the UE is in a coverage area of the first base station, a coordinating cell of the UE is in a coverage area of the second base station, and the fixed duration is greater than a sum of the exchange latency plus a preset value; and a receiver, configured to receive scheduling information sent by the first base station, where the processor is further configured to: determine whether air interface data corresponding to the scheduling information is buffered, and decode the air interface data corresponding to the scheduling information if the processor determines that the air interface data corresponding to the scheduling information is buffered.

With reference to the fifteenth aspect, in a first possible implementation of the fifteenth aspect, the processor is specifically configured to determine, according to a frame number and a subframe number that are corresponding to time domain information in the scheduling information, whether air interface data corresponding to the frame number and the subframe number is buffered; and decode the air interface data corresponding to the frame number and the subframe number if the processor determines that the air interface data corresponding to the frame number and the subframe number is buffered.

With reference to the fifteenth aspect or the first possible implementation of the fifteenth aspect, in a second possible implementation of the fifteenth aspect, the second base station further includes:

a transmitter, configured to: send source bit data obtained after correct decoding to the first base station, or send bit data obtained when decoding is not completed to the first base station.

According to a sixteenth aspect, a communications system is provided, where the communications system includes the first base station according to the sixth aspect and the second base station according to the seventh aspect; or the communications system includes the first base station according to the eighth aspect and the second base station according to the ninth aspect.

According to a seventeenth aspect, a communications system is provided, where the communications system includes the first base station according to the eleventh aspect and the second base station according to the twelfth aspect; or the communications system includes the first base station according to the thirteenth aspect and the second base station according to the fourteenth aspect.

The embodiments of the present invention provide the first base station and the second base station, the serving cell of the UE is in the coverage area of the first base station, and the coordinating cell of the UE is in the coverage area of the second base station. The first base station predicts the retransmission scheduling information for the UE in advance, and sends the retransmission scheduling information to the second base station having a large exchange latency, so that a cell of the second base station serves as a coordinating cell to perform joint data receiving when the UE retransmits data. In this way, when the UE retransmits data, the second base station may learn, in time, of a time-frequency resource on which the data is located. Therefore, when a latency between the cells is relatively large, the first base station and the second base station can perform joint data receiving when the UE performs retransmission, to perform joint demodulation and decoding to increase an uplink rate of a user.

Alternatively, the first base station predicts the new transmission scheduling information according to the service type of the UE, and sends the new transmission scheduling information to the second base station in advance, so that the second base station having a large exchange latency may also receive the new transmission scheduling information to perform joint data receiving. In this way, the coordinating cell can save, before the $n^{th}$ scheduling moment arrives, the scheduling information at the $n^{th}$ scheduling moment, and receive, in time according to the scheduling information that is at the $n^{th}$ scheduling moment and that is predicted by the serving cell in advance, the first data that is at the $n^{th}$ scheduling moment and that is sent by a user. Therefore, when an exchange latency is large, the coordinating cell can receive, according to the scheduling information obtained in time, the data sent by the UE, so that the serving cell and the coordinating cell can perform joint data receiving for joint demodulation and decoding, to increase an uplink rate of the user.

Alternatively, the second base station having a large latency in exchange with the first base station buffers the air interface data that is within the fixed duration before the any moment, so that the second base station having a large exchange latency may also obtain the corresponding air interface data according to the scheduling information to perform joint data receiving. In this way, the coordinating cell having a large latency in exchange with the serving cell may buffer the received air interface data, so that for scheduling information that arrives at the coordinating cell later than the air interface data, the coordinating cell can receive uplink data of the UE according to the air interface data and the scheduling information. Therefore, the serving cell and the coordinating cell can perform joint data receiving on the UE for joint demodulation and decoding, to increase an uplink rate of the UE.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
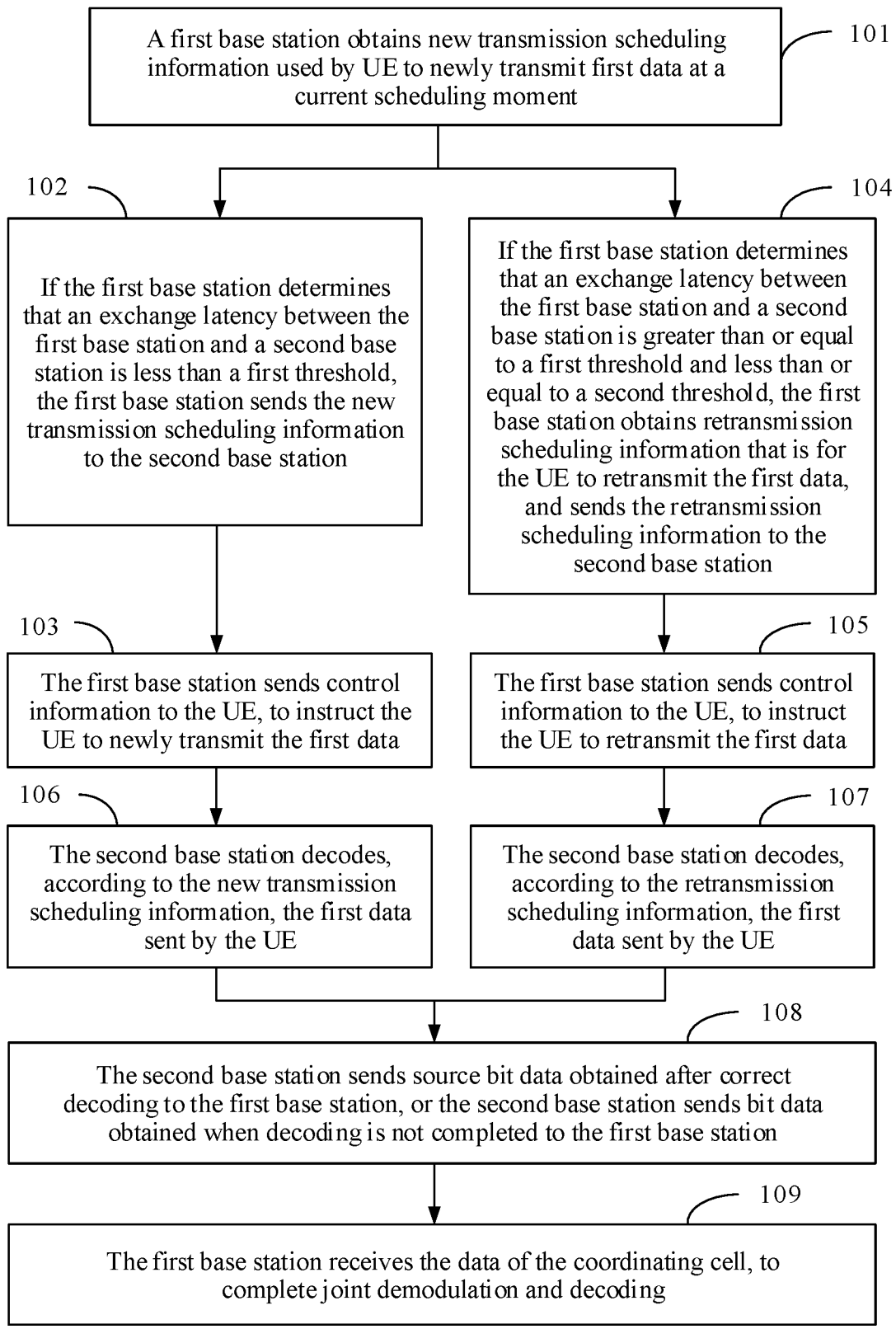
FIG. 1 is a schematic flowchart of a multi-cell uplink coordinated communication method according to an embodiment of the present invention.

An embodiment of the present invention provides a multi-cell uplink coordinated communication method. As shown in FIG. 1, the method includes the following steps.

101. A first base station obtains new transmission scheduling information for UE to newly transmit first data at a current scheduling moment, and then performs step 102 or step 104.

Specifically, when the UE needs to process a service, the UE sends a service request to a serving cell of the UE. In this embodiment, assuming that the first base station is a base station to which the serving cell of the UE belongs, the first base station performs uplink scheduling on the UE according to the service request of the UE, that is, generates, for the UE, the new transmission scheduling information used to newly transmit the first data at the current scheduling moment. The new transmission scheduling information may include a time-frequency resource, a modulation and coding scheme, and the like.

102. If the first base station determines that an exchange latency between the first base station and a second base station is less than a first threshold, the first base station sends the new transmission scheduling information to the second base station, and then performs step 103.

There may be at least one second base station in this application. Before scheduling the UE, the first base station attempts to establish exchange channels to neighboring cells, and obtains exchange latencies between the first base station and the neighboring cells. If an exchange latency between the first base station and a neighboring cell is less than the first threshold, it indicates that the exchange latency between the first base station and the neighboring cell is small. Therefore, the neighboring cell is determined as a coordinating cell. In this way, when the new transmission scheduling information arrives at the neighboring cell, the first data that is of the UE and that is corresponding to the new transmission scheduling information has not arrived at the neighboring cell, that is, before receiving the first data sent by the UE, the neighboring cell has received the new transmission scheduling information sent by the serving cell, so that the neighboring cell schedules the first data of the UE according to the new transmission scheduling information. In addition, when generating the new transmission scheduling information for the UE at the current scheduling moment, the first base station sends control information to the UE, to instruct the UE to newly transmit the data. Assuming that the second base station is a base station to which the coordinating cell of the UE belongs, when receiving the first data sent by the UE, the second base station demodulates and decodes the first data according to the new transmission scheduling information, and sends a decoding result to the first base station after correct decoding, so that the first base station and the second base station perform joint demodulation and decoding.

103. The first base station sends control information to the UE, to instruct the UE to newly transmit the first data, and then step 106 is performed.

104. If the first base station determines that an exchange latency between the first base station and a second base station is greater than or equal to a first threshold and less than or equal to a second threshold, the first base station obtains retransmission scheduling information that is for the UE to retransmit the first data, and sends the retransmission scheduling information to the second base station.

If the first base station determines that the exchange latency between the first base station and the second base station is greater than or equal to the first threshold and less than or equal to the second threshold, it indicates that the exchange latency between the first base station and the second base station is relatively large, so that when receiving the first data sent by the UE, the second base station may have not received scheduling information sent by the first base station. Therefore, the second base station fails to schedule the first data, and cannot perform joint demodulation and decoding with the first base station. In this case, the first base station may calculate, in advance at the current scheduling moment, the retransmission scheduling information that is for a user to retransmit the first data, and send the retransmission scheduling information to the second base station in advance. If the UE needs to retransmit the first data, the first base station sends the control information to the UE, to instruct the UE to retransmit the first data. In this way, when a cell of the second base station serves as a coordinating cell, after receiving the retransmission scheduling information, the cell can obtain in time a time-frequency resource on which the retransmitted first data is located when the UE retransmits the first data, to demodulate and decode the first data. Herein, the UE may retransmit the data due to a poor signal in the serving cell of the UE, another reason, or the like.

In this way, for the UE, a neighboring cell that has a small latency in exchange with the serving cell of the UE can perform joint demodulation and decoding with the serving cell when the UE retransmits the data, and a neighboring cell that has a relatively large latency in exchange with the serving cell of the UE can also perform joint demodulation and decoding with the serving cell when the UE retransmits the data. Therefore, performance of joint demodulation and decoding performed when the UE performs retransmission can be improved, and an uplink rate of the UE is increased.

Time domain information, a redundancy version number used for data retransmission, and data indication information (which is used to indicate data retransmission) in the retransmission scheduling information are re-obtained. A manner for obtaining the redundancy version number used for data retransmission may be the same as that in the prior art. Frequency domain information, a modulation and coding scheme, and the like are the same as frequency domain information, the modulation and coding scheme, and the like in the new transmission scheduling information generated by the first base station in step 101. The time domain information in the retransmission scheduling information may be obtained according to the current scheduling moment, the exchange latency, a preset time interval for the UE to retransmit the first data, a time interval from a time when the first base station completes scheduling to a time when the UE starts to send the uplink data, and a formula. The formula is as follows:

$$T = Tr \times \left\lceil \frac{Te - Ts}{Tr} \right\rceil + T0 + Ts$$

where T represents the time domain information; Tr represents the preset time interval for the UE to retransmit the first data, that is, a retransmission interval specified in a protocol; Te represents the exchange latency; Ts represents the time interval from the time when the first base station completes scheduling to the time when the UE starts to send the first data, and the time interval is preset by the first base station; and T0 represents the current scheduling moment.

This is because for a scheduling result at the moment T0, the cell of the second base station serves as a coordinating cell to receive the scheduling information at a moment T0+Te. Assuming that a time domain resource location, that is, time domain information, sent to the coordinating cell at the moment T0 is T, T0+Te<T needs to be met, so that the coordinating cell can successfully obtain the first data sent by the UE at the moment T. Considering that a difference between T and T0+Ts is an integer multiple of the retransmission interval Tr, T=Tr×N+T0+Ts. N>0, and Tr is the retransmission interval. Therefore, T0+Te<Tr×N+T0+Ts, that is, N>(Te−Ts)/Tr. Because N is a positive integer, $$N = \left\lceil \frac{Te - Ts}{Tr} \right\rceil.$$

It may be learned, according to a value of N, that the time domain information in the retransmission scheduling information sent to the coordinating cell is $$T = Tr \times \left\lceil \frac{Te - Ts}{Tr} \right\rceil + T0 + Ts.$$

105. The first base station sends control information to the UE, to instruct the UE to retransmit the first data, and then step 107 is performed.

The UE may need to retransmit the first data due to a poor signal of the first base station, a joint scheduling failure, or another reason.

106. The second base station decodes, according to the new transmission scheduling information, the first data sent by the UE, and then performs step 108.

107. The second base station decodes, according to the retransmission scheduling information, the first data sent by the UE.

If the exchange latency between the first base station and the second base station is less than the first threshold, it indicates that the exchange latency between the first base station and the second base station is small. When receiving the first data newly transmitted by the UE, the second base station may receive the new transmission scheduling information sent by the first base station, so that the second base station serves as a coordinating cell to decode the uplink data according to the scheduling information. If the UE performs retransmission due to a poor signal of the first base station or another reason, the first base station sends the retransmission scheduling information to a second base station that has a small exchange latency, so that the second base station decodes the retransmitted data when the UE performs retransmission. However, when sending the new transmission scheduling information to the second base station that has a small exchange latency, the first base station also sends the retransmission scheduling information to a second base station whose exchange latency is greater than or equal to the first threshold and less than or equal to the second threshold, that is, sends the retransmission scheduling information in advance to the second base station that has a large exchange latency. In this way, if the UE retransmits the data, when receiving the first data retransmitted by the UE, the second base station that has a large exchange latency can learn, in time, of a time-frequency resource on which the first data is located, a modulation and coding scheme, and the like, to decode the retransmitted first data. That is, a cell of the second base station that has a large exchange latency also serves a coordinating cell to participate in retransmission scheduling, and a quantity of coordinating cells used when the UE performs retransmission increases, so that performance of joint receiving and demodulation of the first base station and the second base station is improved.

In addition, before the serving cell and the coordinating cell jointly receive the data sent by the UE, the coordinating cell may first perform joint scheduling on the UE. Specifically, multiple cells share one centralized scheduler to perform joint scheduling on all users belonging to the cells, so that for users between which interference is relatively strong, time-frequency resources scheduled for the users may be staggered by means of joint scheduling, to reduce the interference between each other, and improve uplink transmission performance of the users. However, in an actual scenario, base stations having limited exchange capabilities (for example, an exchange latency is large, or exchange bandwidth is small) are usually in different equipment rooms. Because there is usually a transit device between base stations in different equipment rooms, a latency of an exchange channel between cells is relatively large. An implementation of joint scheduling performed by the centralized scheduler also has a relatively high requirement on a latency between cells. Therefore, when an exchange latency between cells is large, joint scheduling probably cannot be performed in real time by using the centralized scheduler to increase an uplink rate of the user.

Therefore, if technical solutions of the present invention are applied, before the coordinating cell performs joint scheduling, the first base station obtains the retransmission scheduling information in advance, so that the second base station that has a large exchange latency can receive the retransmission scheduling information before joint scheduling, and perform joint scheduling according to the retransmission scheduling information. Specifically, before the second base station decodes, according to the retransmission scheduling information, the first data retransmitted by the UE, the method may further include:

if the second base station determines, according to the time domain information carried in the retransmission scheduling information, that there is second UE to be scheduled in a subframe corresponding to the time domain information, and the second UE causes interference to the first UE, skipping, by the second base station, scheduling the second UE at a location of the subframe.

The interference herein may be determined according to reference signal received power (RSRP) received by the UE from the serving cell. The RSRP represents wireless signal strength of the cell. For example, when the second base station receives retransmission scheduling information for UE 1, there is UE 2 to be scheduled by the second base station in a subframe corresponding to the retransmission scheduling information, and a difference obtained by subtracting an RSRP value of the UE 1 from an RSRP value of the UE 2 is greater than a given threshold, or an RSRP value of the UE 2 is greater than a given threshold, it indicates that the UE 2 causes strong interference to the UE 1. To ensure a priority of retransmitted data, the second base station preferentially schedules the UE 1.

In this case, if the UE retransmits data, and it also needs to consider that the coordinating cell may limit, when receiving the retransmission scheduling information sent by the serving cell, scheduling of UE 2 covered by the coordinating cell, a time needs to be reserved for the coordinating cell to limit scheduling of UE 2. Therefore, when calculating the retransmission scheduling information, the serving cell needs to consider a time at which the coordinating cell may limit scheduling of UE 2, to ensure that the coordinating cell can receive, before limiting scheduling, the retransmission scheduling information sent by the serving cell, so that the coordinating cell determines, according to the time domain information in the retransmission scheduling information, whether scheduling of UE 2 in the cell needs to be limited at frame and subframe locations carried in the retransmission scheduling information. Therefore, when the time domain information in the retransmission scheduling information is calculated in step 103, T'=Tr×N+T0−Tx. T' represents a scheduling moment at which the coordinating cell starts to perform scheduling, and Tx represents a time reserved for the coordinating cell to change scheduling. In this case, T0+Te<Tr×N+T0−Tx, that is, N>(Te+Tx)/Tr, and $$N = \left\lceil \frac{Te + Tx}{Tr} \right\rceil.$$

Therefore, $$T' = Tr \times \left\lceil \frac{Te + Tx}{Tr} \right\rceil + T0 - Tx,$$

and then the time domain information carried in the retransmission scheduling information is obtained by adding T' and Ts.

Certainly, in a scenario in which the retransmission scheduling information is calculated in advance in this embodiment of the present invention, the second base station may perform only joint scheduling and does not perform joint receiving, that is, only scheduling of UEs between which interference is relatively strong is staggered, to increase uplink rates of the UEs.

108. The second base station sends source bit data obtained after correct decoding to the first base station, or the second base station sends bit data obtained when decoding is not completed to the first base station.

109. The first base station receives the data of the coordinating cell, to complete joint demodulation and decoding.

Regardless of whether the UE newly transmits the first data or retransmits the first data to the second base station, and regardless of the exchange latency between the first base station and the second base station, the second base station may send, to the first base station, the source bit data that is finally obtained after correctly decoding the first data of the UE. In this case, the first base station may directly send the source bit data to a radio link control (RLC) protocol layer for further packaging processing. Alternatively, the second base station may send intermediate data obtained in a decoding process to the first base station, and the first base station merges, for further joint demodulation and decoding and according to a type of the intermediate data, the intermediate data and bit data that is of the same type and that is received by the cell of the first base station. Compared with a case in which the second base station may have a decoding error and fail to send correct source bit data to the first base station, such a manner of sending the intermediate data to the serving cell may improve a feature of joint demodulation and decoding of the serving cell. For example, the coordinating cell may send, to the serving cell, bit data that is obtained after demodulation and that is before decoding, and the serving cell may merge and decode de-rate matching bit data. This application sets no limitation.

In the foregoing process, because the source bit data occupies smaller bandwidth than the intermediate bit data, if bandwidth between the coordinating cell and the serving cell is relatively small, the coordinating cell may choose to send the source bit data obtained after correct decoding to the serving cell; if bandwidth between the coordinating cell and the serving cell is relatively large, the coordinating cell may choose to send the intermediate bit data obtained when decoding is not completed to the serving cell.

This embodiment of the present invention provides the multi-cell uplink coordinated communication method, applied to the first base station and the second base station. The first base station is the base station to which the serving cell of the UE belongs, and the second base station is the base station to which the coordinating cell of the UE belongs. The first base station obtains the new transmission scheduling information for the first data that is newly transmitted by the UE at the current scheduling moment. If the exchange latency between the first base station and the second base station is less than the first threshold, the first base station sends the new transmission scheduling information to the second base station. If the exchange latency between the first base station and the second base station is greater than or equal to the first threshold and less than or equal to the second threshold, the first base station obtains the retransmission scheduling information that is for the UE to retransmit the first data, and sends the retransmission scheduling information to the second base station. In this way, when the UE retransmits the first data, the second base station may learn, in time, of the time-frequency resource on which the first data is located. Therefore, when a latency between the cells is relatively large, the first base station and the second base station can perform joint data receiving and decoding when the UE performs retransmission, to increase an uplink rate of a user.

In the embodiment shown in FIG. 1, when the exchange latency between the cells is relatively large, the serving cell needs to predict the retransmission scheduling information, but the coordinating cell still cannot process data newly transmitted by the user equipment. That is, when the exchange latency between the cells is relatively large, an initial block error rate (IBLER) of a user cannot be effectively reduced.

Figure 2:
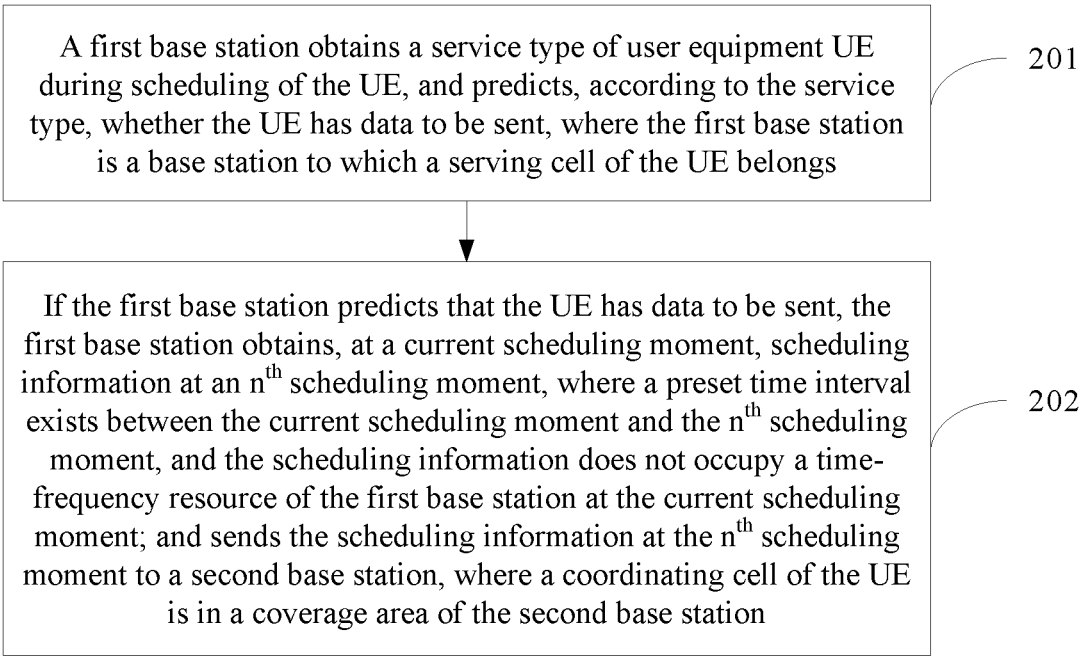
FIG. 2 is a schematic flowchart of a multi-cell uplink coordinated communication method according to another embodiment of the present invention.

To resolve this problem, an embodiment of the present invention provides a coordinated receiving solution based on new transmission scheduling performed in advance when an exchange latency between cells is large. New transmission scheduling is completed ahead of a time period by predicting a service traffic requirement of a user, and new transmission scheduling information is notified to a neighboring cell, so that the neighboring cell may obtain in time the new transmission scheduling information for a target user. Therefore, this embodiment of the present invention provides a multi-cell uplink coordinated communication method. As shown in FIG. 2, the method includes the following steps.

201. A first base station obtains a service type of user equipment UE during scheduling of the UE, and predicts, according to the service type, whether the UE has data to be sent, where the first base station is a base station to which a serving cell of the UE belongs.

When the UE needs to process a service, as the serving cell of the UE, a cell of the first base station needs to obtain the service type of the UE in a process of scheduling the UE, to generate scheduling information. For example, the service type may be a voice service, a video service, or a short message service. Then it is predicted, according to the service type, whether the UE has data to be sent after a time period, that is, whether service traffic is empty. For example, if the service type represents that uplink data of the UE is periodically sent, it is predicted that the UE has data to be sent. For example, the service type is a voice service or a video service. If the service type represents that uplink data of the UE is not periodically sent, it is predicted that the UE has no data to be sent. For example, the service type is a short message service.

Before generating the scheduling information for the UE, the first base station has determined multiple second base stations to which coordinating cells belong, for example, selects, as the second base station of the coordinating cell, a base station that is of a neighboring cell and whose latency in exchange with the first base station is less than a threshold, and establishes an exchange channel.

The time period herein is greater than or equal to a sum of a preset value and a maximum exchange latency between the first base station and the second base station.

The time period needs to be greater than or equal to the maximum exchange latency to ensure that the scheduling information obtained in advance may arrive at the coordinating cell earlier than the uplink data of the UE. The preset value is a correction quantity in consideration of a processing latency. For example, after completing scheduling, the first base station sends the scheduling information to the UE only after a fixed latency (for example, 3 ms), and then the UE sends the uplink data. The fixed latency is the preset value, and the maximum exchange latency is subtracted by 3 ms. In addition, after receiving the scheduling information, the coordinating cell needs a short time period to parse the scheduling information, for example, 100 μs. In this case, 100 μs needs to be added to the maximum exchange latency. Therefore, the preset value may be positive or negative.

202. If the first base station predicts that the UE has data to be sent, the first base station obtains, at a current scheduling moment, scheduling information at an $n^{th}$ scheduling moment, where a preset time interval exists between the current scheduling moment and the $n^{th}$ scheduling moment, and the scheduling information does not occupy a time-frequency resource of the first base station at the current scheduling moment; and sends the scheduling information at the $n^{th}$ scheduling moment to a second base station, where a coordinating cell of the UE is in a coverage area of the second base station.

If the service traffic is not empty after a time period, the first base station performs virtual scheduling on the user in advance at the current scheduling moment. For example, if the current scheduling moment is the $1^{st}$ ms, scheduling information at the $11^{th}$ ms moment is predicted at the $1^{st}$ ms moment; if the current scheduling moment is the $2^{nd}$ ms, scheduling information at the $12^{th}$ ms moment is predicted at the $2^{nd}$ ms moment, and so on. In this case, the preset time interval may be 10 ms. Because the $n^{th}$ scheduling moment after the current scheduling moment has not arrived, the scheduling information obtained in advance does not occupy the time-frequency resource at the current scheduling moment. The scheduling information obtained in advance is saved in the first base station, and then sent to the second base station. When a scheduling moment in the scheduling information that is received by the second base station in advance arrives, a time-frequency resource on which data newly transmitted by the UE, a modulation and coding scheme, and the like can be learned of in time according to the scheduling information, to demodulate and decode the data newly transmitted by the UE. This can avoid a case in which the coordinating cell cannot perform demodulation and decoding and cannot complete joint demodulation and decoding with the serving cell because the uplink data arrives at the coordinating cell but the scheduling information has not arrived at the coordinating cell, so as to reduce an IBLER of the UE.

If it is predicted that the service traffic is empty after a time period, virtual scheduling may not need to be performed for the UE in advance.

When a first scheduling moment corresponding to a subframe in the scheduling information obtained after scheduling is performed for the UE in advance arrives, that is, an actual scheduling moment corresponding to the subframe, because there may be more than one user that needs to be scheduled in the subframe corresponding to the actual scheduling moment, or the first base station does not consider that a time-frequency resource allocated by the first base station in advance is currently an optimum time-frequency resource, or the like, to ensure that the scheduling information sent to the second base station in advance is valid, the first base station preferentially allocates, to the UE according to the saved scheduling information, a time-frequency resource scheduled in advance.

After the second base station receives the scheduling information that is obtained by the first base station in advance, when the actual scheduling moment corresponding to the scheduling information received by the second base station arrives, the second base station can perform demodulation and decoding for the target user in the subframe corresponding to the scheduling information, and send, to the first base station, source bit data obtained after correct decoding or bit data obtained in a decoding process. For a specific implementation thereof, refer to step 108.

It should be noted that, if the second base station determines that there is second UE to be scheduled in the subframe carried in the scheduling information at the $n^{th}$ scheduling moment, and the second UE causes interference to the first UE, the second base station does not schedule the second UE at a location of the subframe. That is, when the actual scheduling moment corresponding to the scheduling information received by the second base station arrives, if there is another user equipment to be scheduled in the subframe in the scheduling information, and the another user equipment causes strong interference to the target user equipment, scheduling of the another user equipment is prohibited at a time-frequency resource location that the target user equipment needs to occupy. For details, refer to step 107.

In this case, if it further needs to consider that the second base station may change scheduling information for the second UE in the cell of the second base station, when the first base station sends the scheduling information that is at the $n^{th}$ scheduling moment after the current scheduling moment, the first base station needs to reserve a time for a case in which the second base station may change scheduling information for another user equipment. The first base station needs to predict ahead of a longer time whether the service traffic is empty after a time period, to obtain ahead of a longer time the scheduling information that is at the $n^{th}$ scheduling moment after the current scheduling moment. Therefore, the time period in this case needs to be greater than or equal to a sum of the maximum exchange latency between the first base station and the second base stations, the preset value, and a planned reserved time.

This embodiment of the present invention provides the multi-cell uplink coordinated communication method, applied to the first base station and the second base station. The first base station is the base station to which the serving cell of the UE belongs, and the second base station is the base station to which the coordinating cell of the UE belongs. The first base station obtains the service type of the user equipment UE during scheduling of the UE, and predicts, according to the service type, whether the UE has data to be sent. If the first base station predicts that the UE has data to be sent, the first base station obtains, at the current scheduling moment, the scheduling information at the $n^{th}$ scheduling moment, where the preset time interval exists between the current scheduling moment and the $n^{th}$ scheduling moment, and the scheduling information does not occupy the time-frequency resource of the first base station at the current scheduling moment; and sends the scheduling information at the $n^{th}$ scheduling moment to the second base station. In this way, the coordinating cell can save, before the $n^{th}$ scheduling moment arrives, the scheduling information at the $n^{th}$ scheduling moment. Therefore, when an exchange latency is large, the coordinating cell schedules, according to the scheduling information that is at the $n^{th}$ scheduling moment and that is predicted by the serving cell in advance, uplink data that is at the $n^{th}$ scheduling moment and that is sent by a user, so that the serving cell and the coordinating cell perform joint data receiving for joint demodulation and decoding, to increase an uplink rate of the user.

In the embodiment shown in FIG. 1, after retransmission information obtained in advance is sent to the second base station, the UE probably does not perform retransmission. As a result, the retransmission scheduling information sent to the second base station in advance is invalid, scheduling performed in advance fails, and receiving processing of the coordinating cell is invalidated. In the embodiment shown in FIG. 2, the time-frequency resource that is in the scheduling information and that is allocated in advance by the first base station or the second base station may be inconsistent with an actually allocated time-frequency resource. Consequently, scheduling performed in advance fails, and receiving processing of the coordinating cell is invalidated. For the problems, this application proposes an inter-cell coordinated receiving solution based on buffered air interface data.

Figure 3:
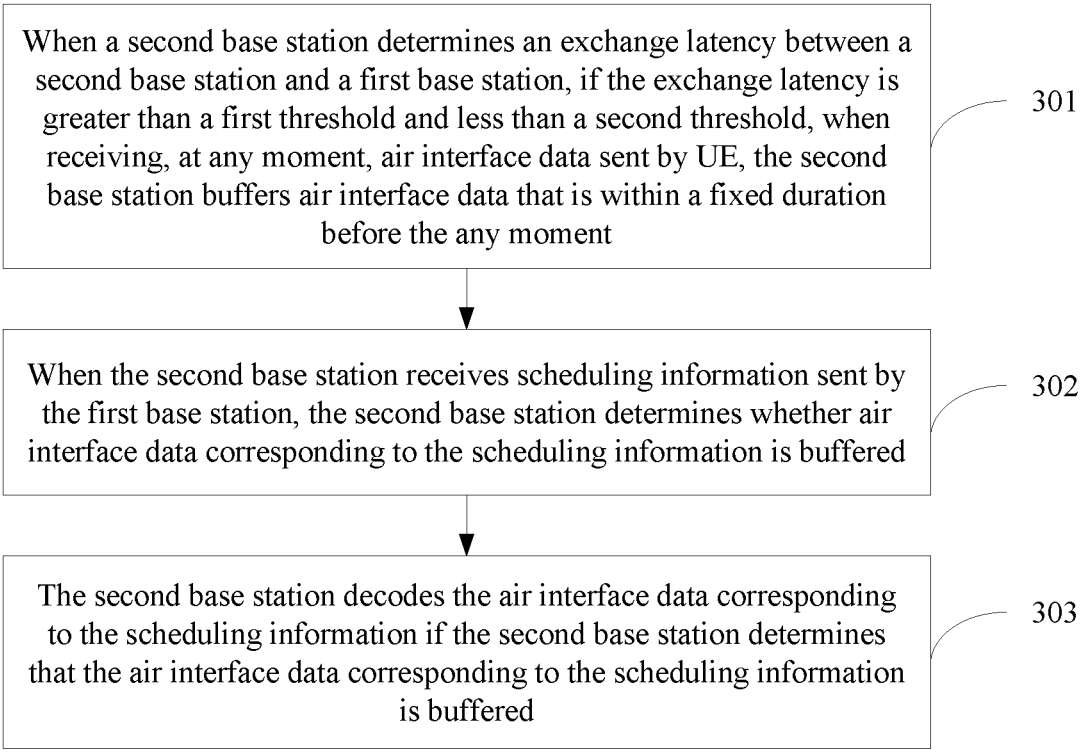
FIG. 3 is a schematic flowchart of a multi-cell uplink coordinated communication method according to another embodiment of the present invention.

Therefore, an embodiment of the present invention provides a multi-cell uplink coordinated communication method. As shown in FIG. 3, the method includes the following steps.

301. When a second base station determines an exchange latency between the second base station and a first base station, if the exchange latency is greater than a first threshold and less than a second threshold, when receiving, at any moment, air interface data sent by UE, the second base station buffers air interface data that is within fixed duration before the any moment.

The first base station is a base station to which a serving cell of the UE belongs, and the second base station is a base station to which a coordinating cell of the UE belongs.

In the prior art, before the first base station corresponding to the serving cell generates scheduling information for target user equipment, the first base station attempts to establish exchange channels to neighboring cells, and obtains exchange latencies. If the exchange latency between the second base station and the first base station is less than or equal to the first threshold, the first base station and the second base station may consider that the exchange latency between the two base stations is relatively small, and the first base station uses a cell of the second base station having a relatively small exchange latency as a coordinating cell.

In this embodiment, if the exchange latency between the first base station and the second base station is greater than the first threshold and less than the second threshold, the cell of the second base station is still used as the coordinating cell of the first base station. That is, when receiving, at any moment, the air interface data sent by the UE, the second base station buffers the air interface data that is within the fixed duration before the any moment. In this case, when receiving the air interface data sent by the UE, the second base station having a large exchange latency may have not received scheduling information sent by the first base station. Therefore, the second base station may first buffer the received air interface data, and wait for the scheduling information to arrive. For example, the second base station buffers, at the $10^{th}$ ms moment, air interface data received at the $0^{th}$ to $9^{th}$ ms moments, and buffers, at the $11^{th}$ ms moment, air interface data received at the $1^{st}$ to $10^{th}$ ms moments. It may also be understood as that, air interface data received at any moment is buffered for fixed duration, for example, air interface data received at the $8^{th}$ ms is buffered for 10 ms, and air interface data received at the $9^{th}$ ms is buffered for 10 ms.

The second base station may determine, according to capability information of the second base station, whether to buffer air interface data on entire or partial bandwidth. The air interface data packet includes received uplink data sent by the UE. Certainly, if no UE sends uplink data, for example, voice transmission is not in a voice service, the air interface data may include background noise or the like.

The fixed duration is greater than a sum of a preset value and the exchange latency between the first base station and the second base station, so that when buffering the air interface data, the second base station can obtain corresponding air interface data according to scheduling information when the scheduling information arrives at the second base station.

The preset value is a correction quantity in consideration of a processing latency, and is a margin reserved for an exchange latency between the cells. Specifically, the preset value is similar to that in step 201. For example, the fixed duration may be: exchange latency+(100 μs–3 ms).

302. When the second base station receives scheduling information sent by the first base station, the second base station determines whether air interface data corresponding to the scheduling information is buffered.

After completing obtaining of scheduling information at a current scheduling moment, the first base station sends the scheduling information to coordinating cells. Base stations corresponding to the coordinating cells herein include the second base station that has a small latency in exchange with the first base station and the second base station that has a large latency in exchange with the first base station, that is, a quantity of coordinating cells that have large exchange latencies increases. In this way, when the second base station of the coordinating cell receives the scheduling information sent by the first base station, the second base station determines, according to a frame number and a subframe number that are carried in the scheduling information, whether air interface data corresponding to the frame number and the subframe number is buffered. Herein, there may be no air interface data corresponding to a corresponding time-frequency resource in a buffer, probably because the second base station buffers air interface data on partial bandwidth, that is, no corresponding air interface data is found in a frequency domain, or there may be another reason. This application sets no limitation.

303. The second base station decodes the air interface data corresponding to the scheduling information if the second base station determines that the air interface data corresponding to the scheduling information is buffered.

If the air interface data corresponding to the frame number and the subframe number in the scheduling information is found in the buffer, the cells of the second base station serve as a coordinating cell to demodulate and decode the air interface data.

In this way, when a neighboring cell having a large exchange latency also serves as a coordinating cell to perform demodulation and decoding, a quantity of coordinating cells increases, and a probability that the coordinating cell performs correct decoding increases. Therefore, a feature of joint demodulation and decoding between the coordinating cell and the serving cell is improved, and an uplink rate of the UE is increased.

Similar to step 108, the second base station may send source bit data obtained after correct decoding to the first base station, or send bit data obtained when decoding is not completed to the first base station.

This embodiment of the present invention provides the multi-cell uplink coordinated communication method, applied to the first base station and the second base station. The serving cell of the UE is in a coverage area of the first base station, and the coordinating cell of the UE is in a coverage of the second base station. When the second base station determines the exchange latency between the second base station and the first base station, if the exchange latency is greater than the first threshold and less than the second threshold, when receiving, at any moment, the air interface data sent by the UE, the second base station buffers the air interface data that is within the fixed duration before the any moment. When the second base station receives the scheduling information sent by the first base station, the second base station determines whether the air interface data corresponding to the scheduling information is buffered, and if the second base station determines that the air interface data corresponding to the scheduling information is buffered, decodes the air interface data corresponding to the scheduling information. In this way, the coordinating cell having a relatively large latency in exchange with the serving cell may buffer the received air interface data, so that for scheduling information that arrives at the coordinating cell later than the air interface data, the coordinating cell can schedule the uplink data of the UE according to the air interface data and the scheduling information. Therefore, the serving cell and the coordinating cell can perform joint data receiving on the UE for joint demodulation and decoding, to increase an uplink rate of the UE.

Figure 4:
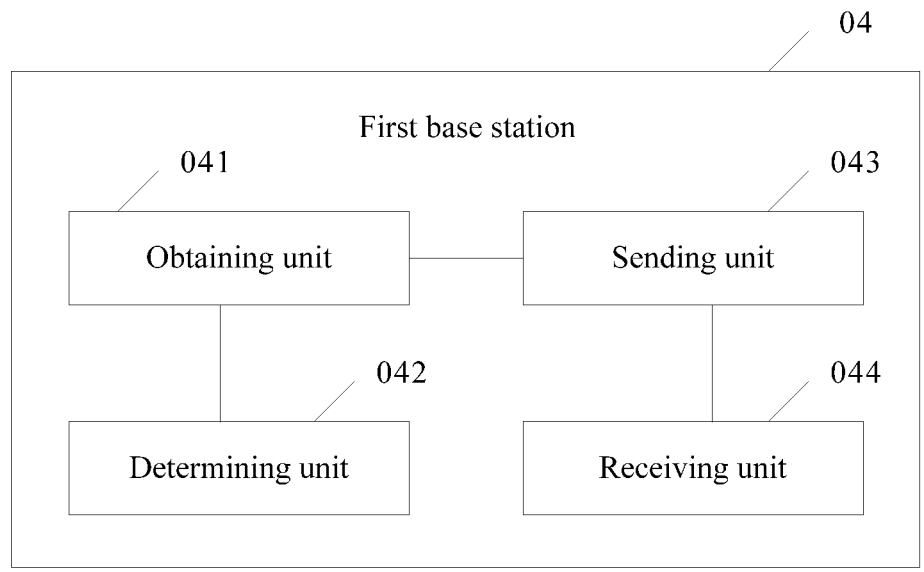
FIG. 4 is a schematic structural diagram of a first base station according to an embodiment of the present invention.

An embodiment of the present invention provides a first base station 04. As shown in FIG. 4, the base station 04 includes:

an obtaining unit 041, configured to obtain new transmission scheduling information for user equipment UE to newly transmit first data at a current scheduling moment, where the first base station is a base station to which a serving cell of the UE belongs;

a determining unit 042, configured to determine that an exchange latency between the first base station and a second base station is greater than or equal to a first threshold and less than or equal to a second threshold, where the obtaining unit 041 is further configured to obtain retransmission scheduling information that is for the UE to retransmit the first data; and a sending unit 043, configured to send the retransmission scheduling information to the second base station, where the second base station is a base station to which a coordinating cell of the UE belongs.

Optionally, the retransmission scheduling information includes time domain information, frequency domain information, a redundancy version number, data retransmission indication information, and a modulation and coding scheme.

The time domain information in the retransmission scheduling information is obtained according to the following formula:

$$T = Tr \times \left\lceil \frac{Te - Ts}{Tr} \right\rceil + T0 + Ts.$$

T represents the time domain information in the retransmission scheduling information, T0 represents the current scheduling moment, Te represents the exchange latency, Tr represents a preset time interval for the UE to retransmit the first data, and Ts represents a time interval from a time when the first base station completes scheduling to a time when the UE starts to send the first data.

Optionally, the first base station further includes a receiving unit 044, configured to: receive source bit data obtained after the second base station correctly decodes the first data retransmitted by the UE, and perform packaging according to the source bit data; or receive first bit data obtained when the second base station does not complete decoding of the first data retransmitted by the UE, and merge, for joint demodulation and decoding, the first bit data and second bit data that is of a same type as the first bit data and that is obtained by the first base station in a process of decoding the first data.

This embodiment of the present invention provides the first base station. The first base station is the base station to which the serving cell of the UE belongs, and the second base station is the base station to which the coordinating cell of the UE belongs. The first base station obtains the new transmission scheduling information for the UE to newly transmit the first data at the current scheduling moment, determines that the exchange latency between the first base station and the second base station is greater than or equal to the first threshold and less than or equal to the second threshold, obtains the retransmission scheduling information that is for the UE to retransmit the first data, and sends the retransmission scheduling information to the second base station. The coordinating cell of the UE is in a coverage area of the second base station. In this way, when the UE retransmits the first data, the second base station may learn, in time, of a time-frequency resource on which the first data is located. Therefore, when a latency between the cells is relatively large, the first base station and the second base station can perform joint data receiving when the UE performs retransmission, to perform joint demodulation and decoding to increase an uplink rate of a user.

Figure 5:
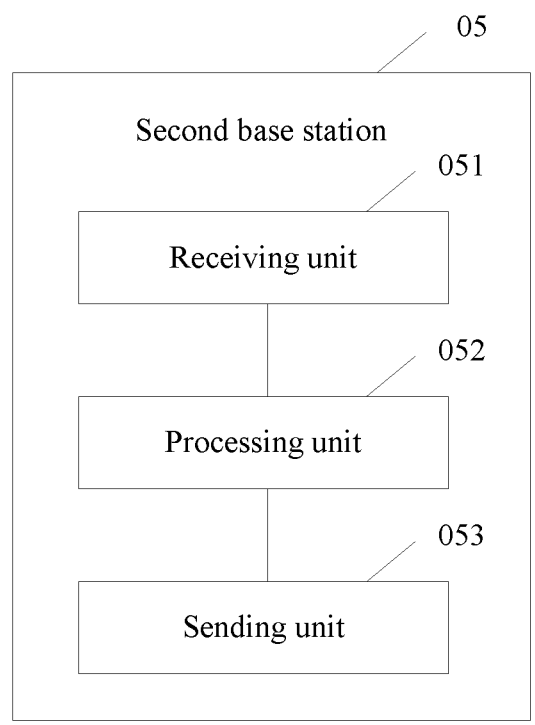
FIG. 5 is a schematic structural diagram of a second base station according to an embodiment of the present invention.

An embodiment of the present invention provides a second base station 05. As shown in FIG. 5, the second base station 05 includes:

a receiving unit 051, configured to receive retransmission scheduling information that is sent by a first base station and that is for first user equipment UE to retransmit first data, where an exchange latency between the second base station and the first base station is greater than or equal to a first threshold and less than or equal to a second threshold, the first base station is a base station to which a serving cell of the UE belongs, and the second base station is a base station to which a coordinating cell of the UE belongs, where the receiving unit 051 is further configured to receive the first data retransmitted by the first UE; and a processing unit 052, configured to decode the first data according to the retransmission scheduling information.

Optionally, the processing unit 052 is further configured to:

if the processing unit 052 determines, according to time domain information in the retransmission scheduling information, that there is second UE to be scheduled in a subframe corresponding to the time domain information, and the second UE causes interference to the first UE, skip scheduling the second UE at a location of the subframe.

Optionally, the second base station further includes a sending unit 053, configured to: send source bit data obtained after correct decoding to the first base station, or send bit data obtained when decoding is not completed to the first base station.

This embodiment of the present invention provides the second base station. The first base station is the base station to which the serving cell of the UE belongs, and the second base station is the base station to which the coordinating cell of the UE belongs. The second base station receives the retransmission scheduling information that is sent by the first base station and that is for the first UE to retransmit the first data. The exchange latency between the second base station and the first base station is greater than or equal to the first threshold and less than or equal to the second threshold. The second base station receives the first data retransmitted by the first UE. The second base station decodes the first data according to the retransmission scheduling information. In this way, when a latency between the cells is relatively large, and when the UE retransmits the first data, the second base station may learn, in time, of a time-frequency resource on which the first data is located, so that the first base station and the second base station can perform joint data receiving when the UE performs retransmission, to perform joint demodulation and decoding to increase an uplink rate of a user.

Figure 6:
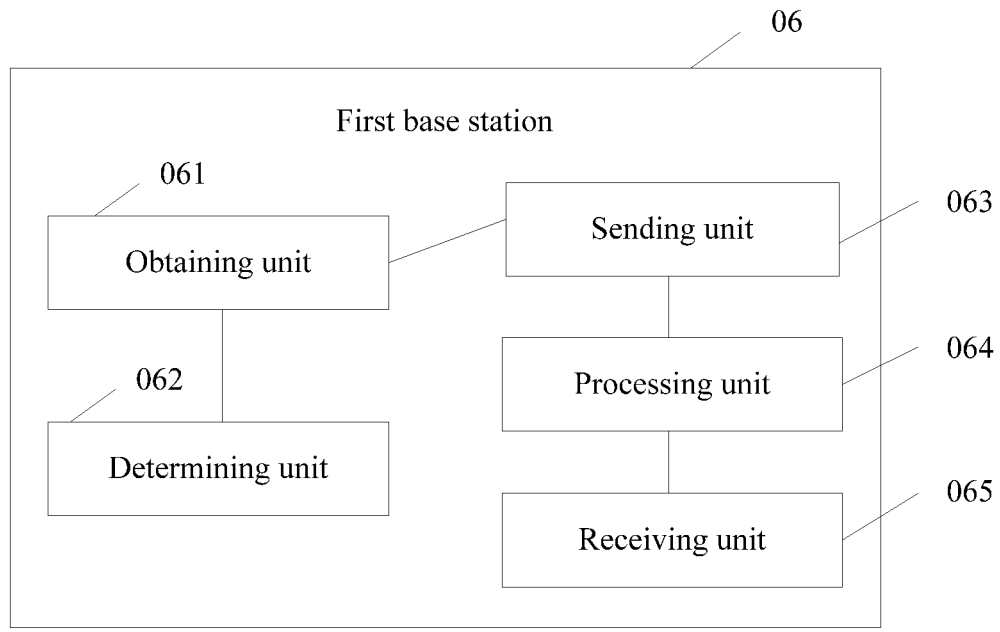
FIG. 6 is a schematic structural diagram of a first base station according to an embodiment of the present invention.

An embodiment of the present invention provides a first base station 06. As shown in FIG. 6, the first base station 06 includes:

an obtaining unit 061, configured to obtain a service type of user equipment UE during scheduling of the UE;

a determining unit 062, configured to predict, according to the service type, whether the UE has data to be sent, where the first base station is a base station to which a serving cell of the UE belongs; where the obtaining unit 061 is further configured to: if it is predicted that the UE has data to be sent, obtain, at a current scheduling moment, scheduling information at an $n^{th}$ scheduling moment, where a preset time interval exists between the current scheduling moment and the $n^{th}$ scheduling moment, and the scheduling information does not occupy a time-frequency resource of the first base station at the current scheduling moment; and a sending unit 063, configured to send the scheduling information at the $n^{th}$ scheduling moment to a second base station, where the second base station is a base station to which a coordinating cell of the UE belongs.

Optionally, the first base station further includes a processing unit 064, configured to: when a first scheduling moment corresponding to a subframe in the scheduling information arrives, preferentially allocate a time-frequency resource at the first scheduling moment to the UE.

Optionally, the first base station further includes a receiving unit 065, configured to: receive source bit data obtained after the second base station correctly decodes first data, and perform packaging according to the source bit data; or receive first bit data obtained when the second base station does not complete decoding of first data, and merge, for joint demodulation and decoding, the first bit data and second bit data that is of a same type as the first bit data and that is obtained by the first base station in a process of decoding the uplink data.

This embodiment of the present invention provides the first base station. The first base station is the base station to which the serving cell of the UE belongs, and the second base station is the base station to which the coordinating cell of the UE belongs. The first base station obtains the service type of the user equipment UE during scheduling of the UE, and predicts, according to the service type, whether the UE has data to be sent after a time period. If the first base station predicts that the UE has data to be sent, the first base station obtains, at the current scheduling moment, the scheduling information at the $n^{th}$ scheduling moment, where the preset time interval exists between the current scheduling moment and the $n^{th}$ scheduling moment, and the scheduling information does not occupy the time-frequency resource of the first base station at the current scheduling moment; and sends the scheduling information at the $n^{th}$ scheduling moment to the second base station. In this way, the coordinating cell can save, before the $n^{th}$ scheduling moment arrives, the scheduling information at the $n^{th}$ scheduling moment, and receive, in time according to the scheduling information that is at the $n^{th}$ scheduling moment and that is predicted by the serving cell in advance, the first data that is at the $n^{th}$ scheduling moment and that is sent by a user. Therefore, when an exchange latency is large, the coordinating cell can receive, according to the scheduling information obtained in time, the data sent by the UE, so that the serving cell and the coordinating cell can perform joint data receiving for joint demodulation and decoding, to increase an uplink rate of the user.

Figure 7:
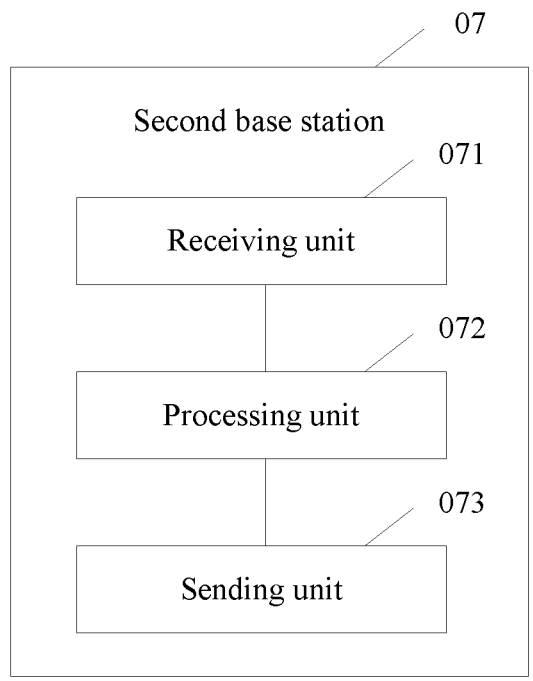
FIG. 7 is a schematic structural diagram of a second base station according to an embodiment of the present invention.

An embodiment of the present invention provides a second base station 07. As shown in FIG. 7, the second base station 07 includes:

a receiving unit 071, configured to receive scheduling information that is at an $n^{th}$ scheduling moment and that is obtained by a first base station at a current scheduling moment, where a preset time interval exists between the current scheduling moment and the $n^{th}$ scheduling moment, and the scheduling information does not occupy a time-frequency resource of the first base station at the current scheduling moment; and a processing unit 072, configured to decode, according to the scheduling information at the $n^{th}$ scheduling moment, first data that is at the $n^{th}$ scheduling moment and that is sent by first user equipment UE, where the first base station is a base station to which a serving cell of the UE belongs, and the second base station is a base station to which a coordinating cell of the UE belongs.

Optionally, the processing unit 072 is further configured to: if the second base station determines, according to time domain information in the scheduling information at the $n^{th}$ scheduling moment, that there is second UE to be scheduled in a subframe corresponding to the time domain information, and the second UE causes interference to the first UE, skip scheduling the second UE at a location of the subframe.

Optionally, the second base station further includes a sending unit 073, configured to: send source bit data obtained after correct decoding to the first base station, or send bit data obtained when decoding is not completed to the first base station.

This embodiment of the present invention provides the second base station. The first base station is the base station to which the serving cell of the UE belongs, and the second base station is the base station to which the coordinating cell of the UE belongs. The second base station receives the scheduling information that is at the $n^{th}$ scheduling moment and that is obtained by the first base station at the current scheduling moment, where the preset time interval exists between the current scheduling moment and the $n^{th}$ scheduling moment, and the scheduling information does not occupy the time-frequency resource of the first base station at the current scheduling moment. The second base station decodes, according to the scheduling information at the $n^{th}$ scheduling moment, the first data that is at the $n^{th}$ scheduling moment and that is sent by the first user equipment UE. In this way, the coordinating cell can save, before the $n^{th}$ scheduling moment arrives, the scheduling information at the $n^{th}$ scheduling moment, and receive, in time according to the scheduling information that is at the $n^{th}$ scheduling moment and that is predicted by the serving cell in advance, the first data that is at the $n^{th}$ scheduling moment and that is sent by a user. Therefore, when an exchange latency is large, the coordinating cell can receive, according to the scheduling information obtained in time, the data sent by the UE, so that the serving cell and the coordinating cell can perform joint data receiving for joint demodulation and decoding, to increase an uplink rate of the user.

Figure 8:
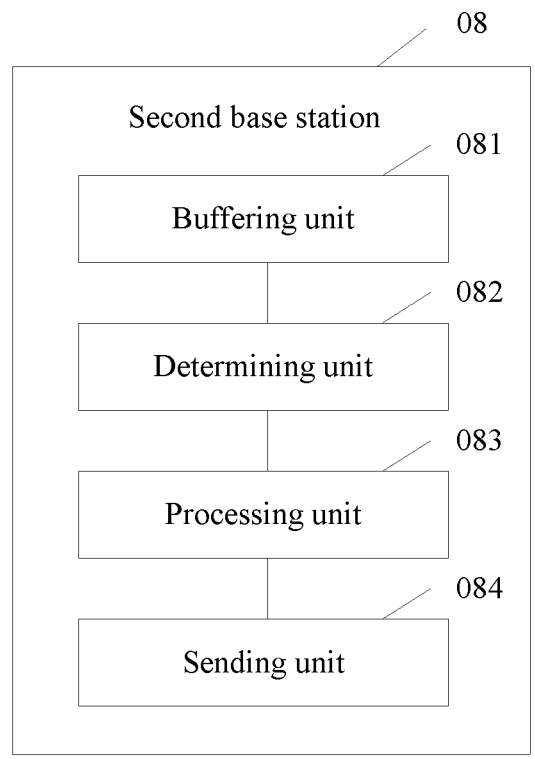
FIG. 8 is a schematic structural diagram of a second base station according to an embodiment of the present invention.

An embodiment of the present invention provides a second base station 08. As shown in FIG. 8, the second base station 08 includes:

a buffering unit 081, configured to: when the second base station determines an exchange latency between the second base station and a first base station, if the exchange latency is greater than a first threshold and less than a second threshold, when receiving, at any moment, air interface data sent by user equipment UE, buffer air interface data that is within fixed duration before the any moment, where a serving cell of the UE is in a coverage area of the first base station, a coordinating cell of the UE is in a coverage area of the second base station, and the fixed duration is greater than a sum of the exchange latency plus a preset value;

a determining unit 082, configured to: when the second base station receives scheduling information sent by the first base station, determine whether air interface data corresponding to the scheduling information is buffered; and a processing unit 083, configured to decode the air interface data corresponding to the scheduling information if the determining unit 082 determines that the air interface data corresponding to the scheduling information is buffered.

Optionally, the determining unit 082 is specifically configured to determine, according to a frame number and a subframe number that are corresponding to time domain information in the scheduling information, whether air interface data corresponding to the frame number and the subframe number is buffered; and the processing unit 083 is specifically configured to decode the air interface data corresponding to the frame number and the subframe number if the determining unit 082 determines that the air interface data corresponding to the frame number and the subframe number is buffered.

Optionally, the second base station further includes a sending unit 084, configured to: send source bit data obtained after correct decoding to the first base station, or send bit data obtained when decoding is not completed to the first base station.

This embodiment of the present invention provides the second base station. The serving cell of the UE is in the coverage area of the first base station, and the coordinating cell of the UE is in the coverage area of the second base station. When the second base station determines the exchange latency between the second base station and the first base station, if the exchange latency is greater than the first threshold and less than the second threshold, when receiving, at any moment, the air interface data sent by the UE, the second base station buffers the air interface data that is within the fixed duration before the any moment. When the second base station receives the scheduling information sent by the first base station, the second base station determines whether the air interface data corresponding to the scheduling information is buffered, and decodes the air interface data corresponding to the scheduling information if the second base station determines the air interface data corresponding to the scheduling information is buffered. In this way, the coordinating cell having a relatively large latency in exchange with the serving cell may buffer the received air interface data, so that for scheduling information that arrives at the coordinating cell later than the air interface data, the coordinating cell can receive uplink data of the UE according to the air interface data and the scheduling information. Therefore, the serving cell and the coordinating cell can perform joint data receiving on the UE for joint demodulation and decoding, to increase an uplink rate of the UE.

Figure 9:
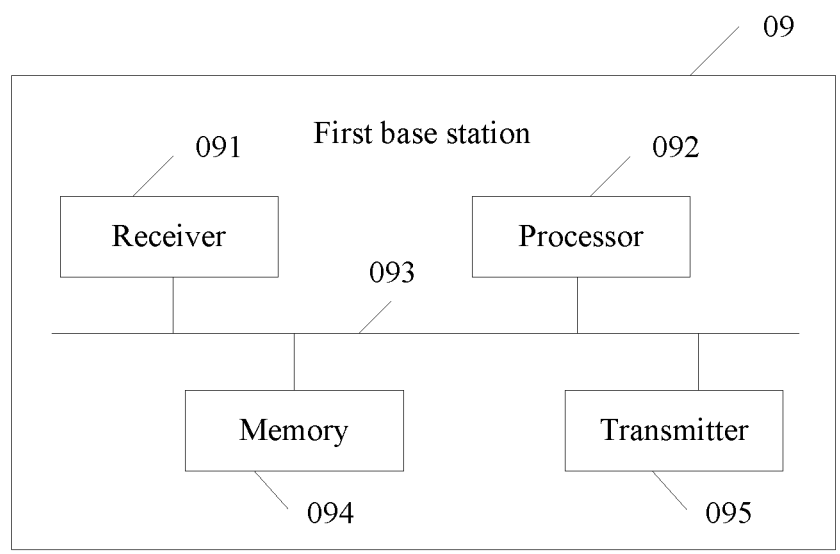
FIG. 9 is a schematic structural diagram of a first base station according to an embodiment of the present invention.

An embodiment of the present invention provides a first base station 09. As shown in FIG. 9, the first base station 09 includes a receiver 091, a processor 092, a bus 093, a memory 094, and a transmitter 095. The memory 094 is configured to store an instruction and data. The processor 092 executes the instruction to obtain new transmission scheduling information for user equipment UE to newly transmit first data at a current scheduling moment. The first base station is a base station to which a serving cell of the UE belongs. The processor 092 executes the instruction to further determine that an exchange latency between the first base station and a second base station is greater than or equal to a first threshold and less than or equal to a second threshold. The processor 092 executes the instruction to further obtain retransmission scheduling information that is for the UE to retransmit the first data. The transmitter 095 executes the instruction to send the retransmission scheduling information to the second base station. The second base station is a base station to which a coordinating cell of the UE belongs.

In this embodiment of the present invention, optionally, the retransmission scheduling information includes time domain information, frequency domain information, a redundancy version number, data retransmission indication information, and a modulation and coding scheme.

The time domain information in the retransmission scheduling information is obtained according to the following formula:

$$T = Tr \times \left\lceil \frac{Te - Ts}{Tr} \right\rceil + T0 + Ts.$$

T represents the time domain information in the retransmission scheduling information, T0 represents the current scheduling moment, Te represents the exchange latency, Tr represents a preset time interval for the UE to retransmit the first data, and Ts represents a time interval from a time when the first base station completes scheduling to a time when the UE starts to send the first data.

In this embodiment of the present invention, optionally, the receiver 091 executes the instruction to receive source bit data obtained after the second base station correctly decodes the first data retransmitted by the UE, and perform packaging according to the source bit data; or receive first bit data obtained when the second base station does not complete decoding of the first data retransmitted by the UE, and merge, for joint demodulation and decoding, the first bit data and second bit data that is of a same type as the first bit data and that is obtained by the first base station in a process of decoding the first data.

This embodiment of the present invention provides the first base station. The first base station is the base station to which the serving cell of the UE belongs, and the second base station is the base station to which the coordinating cell of the UE belongs. The first base station obtains the new transmission scheduling information for the UE to newly transmit the first data at the current scheduling moment, determines that the exchange latency between the first base station and the second base station is greater than or equal to the first threshold and less than or equal to the second threshold, obtains the retransmission scheduling information that is for the UE to retransmit the first data, and sends the retransmission scheduling information to the second base station. The coordinating cell of the UE is in a coverage area of the second base station. In this way, when the UE retransmits the first data, the second base station may learn, in time, of a time-frequency resource on which the first data is located. Therefore, when a latency between the cells is relatively large, the first base station and the second base station can perform joint data receiving when the UE performs retransmission, to perform joint demodulation and decoding to increase an uplink rate of a user.

Figure 10:
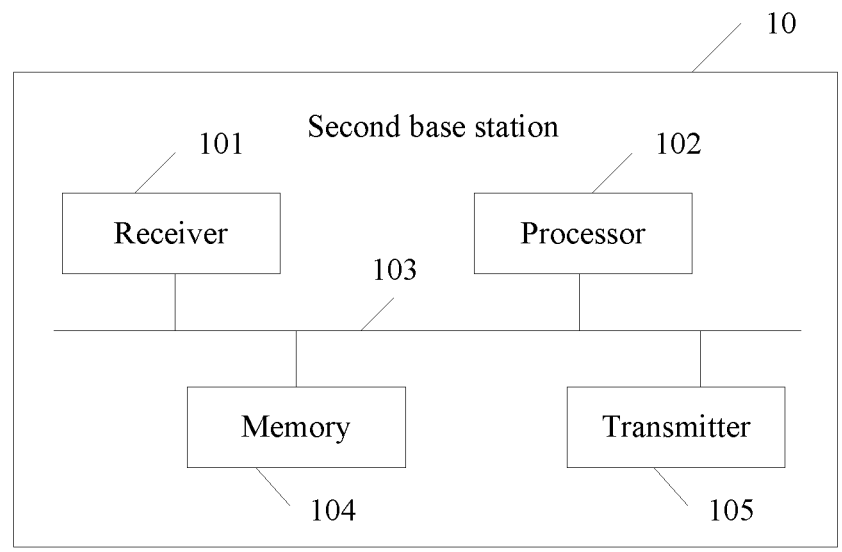
FIG. 10 is a schematic structural diagram of a second base station according to an embodiment of the present invention.

An embodiment of the present invention provides a second base station 10. As shown in FIG. 10, the second base station 10 includes a receiver 101, a processor 102, a bus 103, a memory 104, and a transmitter 105. The memory 104 is configured to store an instruction and data. The receiver 101 executes the instruction to receive retransmission scheduling information that is sent by a first base station and that is for first user equipment UE to retransmit first data. An exchange latency between the second base station and the first base station is greater than or equal to a first threshold and less than or equal to a second threshold, the first base station is a base station to which a serving cell of the UE belongs, and the second base station is a base station to which a coordinating cell of the UE belongs. The receiver 101 executes the instruction to further receive the first data retransmitted by the first UE. The processor 102 executes the instruction to decode the first data according to the retransmission scheduling information.

In this embodiment of the present invention, optionally, the processor 102 executes the instruction to: if the second base station determines, according to time domain information in the retransmission scheduling information, that there is second UE to be scheduled in a subframe corresponding to the time domain information, and the second UE causes interference to the first UE, further skip scheduling the second UE at a location of the subframe.

In this embodiment of the present invention, optionally, the transmitter 105 executes the instruction to send source bit data obtained after correct decoding to the first base station, or send bit data obtained when decoding is not completed to the first base station.

This embodiment of the present invention provides the second base station. The first base station is the base station to which the serving cell of the UE belongs, and the second base station is the base station to which the coordinating cell of the UE belongs. The second base station receives the retransmission scheduling information that is sent by the first base station and that is for the first UE to retransmit the first data. The exchange latency between the second base station and the first base station is greater than or equal to the first threshold and less than or equal to the second threshold. The second base station receives the first data retransmitted by the first UE. The second base station decodes the first data according to the retransmission scheduling information. In this way, when a latency between the cells is relatively large, and when the UE retransmits the first data, the second base station may learn, in time, of a time-frequency resource on which the first data is located, so that the first base station and the second base station can perform joint data receiving when the UE performs retransmission, to perform joint demodulation and decoding to increase an uplink rate of a user.

Figure 11:
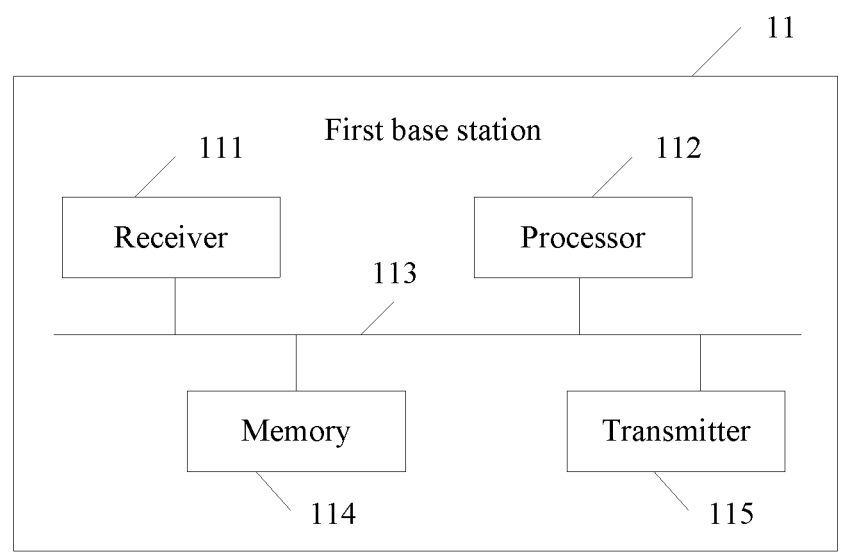
FIG. 11 is a schematic structural diagram of a first base station according to an embodiment of the present invention.

An embodiment of the present invention provides a first base station 11. As shown in FIG. 11, the first base station 11 includes a receiver 111, a processor 112, a bus 113, a memory 114, and a transmitter 115. The memory 114 is configured to store an instruction and data. The processor 112 executes the instruction to obtain a service type of user equipment UE during scheduling of the UE, and predict, according to the service type, whether the UE has data to be sent. The first base station is a base station to which a serving cell of the UE belongs. The processor 112 executes the instruction to: if it is predicted that the UE has data to be sent, further obtain, at a current scheduling moment, scheduling information at an $n^{th}$ scheduling moment, where a preset time interval exists between the current scheduling moment and the $n^{th}$ scheduling moment, and the scheduling information does not occupy a time-frequency resource of the first base station at the current scheduling moment. The transmitter 115 executes the instruction to send the scheduling information at the $n^{th}$ scheduling moment to a second base station. The second base station is a base station to which a coordinating cell of the UE belongs.

Optionally, the processor 112 executes the instruction to: when a first scheduling moment corresponding to a subframe in the scheduling information arrives, further preferentially allocate a time-frequency resource at the first scheduling moment to the UE.

Optionally, the receiver 111 executes the instruction to receive source bit data obtained after the second base station correctly decodes first data, and perform packaging according to the source bit data; or receive first bit data obtained when the second base station does not complete decoding of first data, and merge, for joint demodulation and decoding, the first bit data and second bit data that is of a same type as the first bit data and that is obtained by the first base station in a process of decoding the uplink data.

This embodiment of the present invention provides the first base station. The first base station is the base station to which the serving cell of the UE belongs, and the second base station is the base station to which the coordinating cell of the UE belongs. The first base station obtains the service type of the user equipment UE during scheduling of the UE, and predicts, according to the service type, whether the UE has data to be sent after a time period. If the first base station predicts that the UE has data to be sent, the first base station obtains, at the current scheduling moment, the scheduling information at the $n^{th}$ scheduling moment, where the preset time interval exists between the current scheduling moment and the $n^{th}$ scheduling moment, and the scheduling information does not occupy the time-frequency resource of the first base station at the current scheduling moment; and sends the scheduling information at the $n^{th}$ scheduling moment to the second base station. In this way, the coordinating cell can save, before the $n^{th}$ scheduling moment arrives, the scheduling information at the $n^{th}$ scheduling moment, and receive, in time according to the scheduling information that is at the $n^{th}$ scheduling moment and that is predicted by the serving cell in advance, the first data that is at the $n^{th}$ scheduling moment and that is sent by a user. Therefore, when an exchange latency is large, the coordinating cell can receive, according to the scheduling information obtained in time, the data sent by the UE, so that the serving cell and the coordinating cell can perform joint data receiving for joint demodulation and decoding, to increase an uplink rate of the user.

Figure 12:
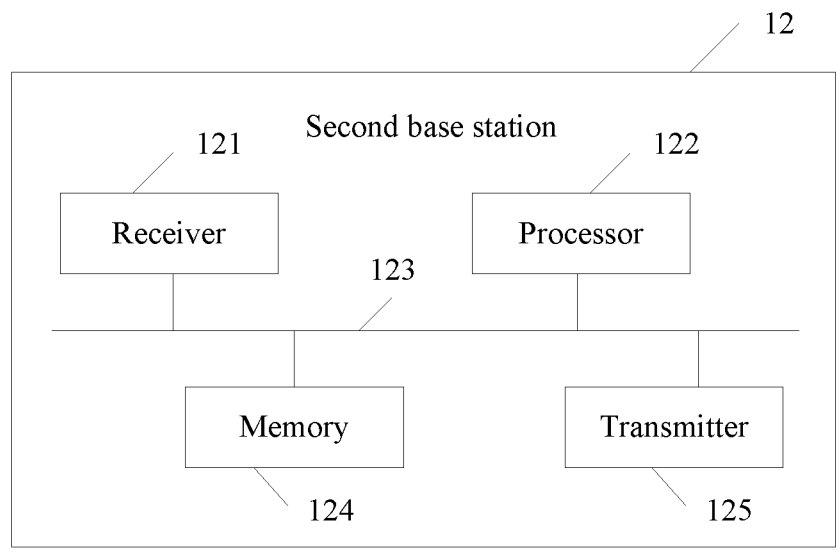
FIG. 12 is a schematic structural diagram of a second base station according to an embodiment of the present invention.

An embodiment of the present invention provides a second base station 12. As shown in FIG. 12, the second base station 12 includes a receiver 121, a processor 122, a bus 123, a memory 124, and a transmitter 125. The memory 124 is configured to store an instruction and data. The receiver 121 executes the instruction to receive scheduling information that is at an $n^{th}$ scheduling moment and that is obtained by a first base station at a current scheduling moment, where a preset time interval exists between the current scheduling moment and the $n^{th}$ scheduling moment, and the scheduling information does not occupy a time-frequency resource of the first base station at the current scheduling moment. The processor 122 executes the instruction to decode, according to the scheduling information at the $n^{th}$ scheduling moment, first data that is at the $n^{th}$ scheduling moment and that is sent by first user equipment UE.

The first base station is a base station to which a serving cell of the UE belongs, and the second base station is a base station to which a coordinating cell of the UE belongs.

Optionally, the processor 122 executes the instruction to: if the second base station determines, according to time domain information in the scheduling information at the $n^{th}$ scheduling moment, that there is second UE to be scheduled in a subframe corresponding to the time domain information, and the second UE causes interference to the first UE, further skip scheduling the second UE at a location of the subframe.

Optionally, the transmitter 125 executes the instruction to send source bit data obtained after correct decoding to the first base station, or send bit data obtained when decoding is not completed to the first base station.

This embodiment of the present invention provides the second base station. The first base station is the base station to which the serving cell of the UE belongs, and the second base station is the base station to which the coordinating cell of the UE belongs. The second base station receives the scheduling information that is at the $n^{th}$ scheduling moment and that is obtained by the first base station at the current scheduling moment, where the preset time interval exists between the current scheduling moment and the $n^{th}$ scheduling moment, and the scheduling information does not occupy the time-frequency resource of the first base station at the current scheduling moment. The second base station decodes, according to the scheduling information at the $n^{th}$ scheduling moment, the first data that is at the $n^{th}$ scheduling moment and that is sent by the first user equipment UE. In this way, the coordinating cell can save, before the $n^{th}$ scheduling moment arrives, the scheduling information at the $n^{th}$ scheduling moment, and receive, in time according to the scheduling information that is at the $n^{th}$ scheduling moment and that is predicted by the serving cell in advance, the first data that is at the $n^{th}$ scheduling moment and that is sent by a user. Therefore, when an exchange latency is large, the coordinating cell can receive, according to the scheduling information obtained in time, the data sent by the UE, so that the serving cell and the coordinating cell can perform joint data receiving for joint demodulation and decoding, to increase an uplink rate of the user.

Figure 13:
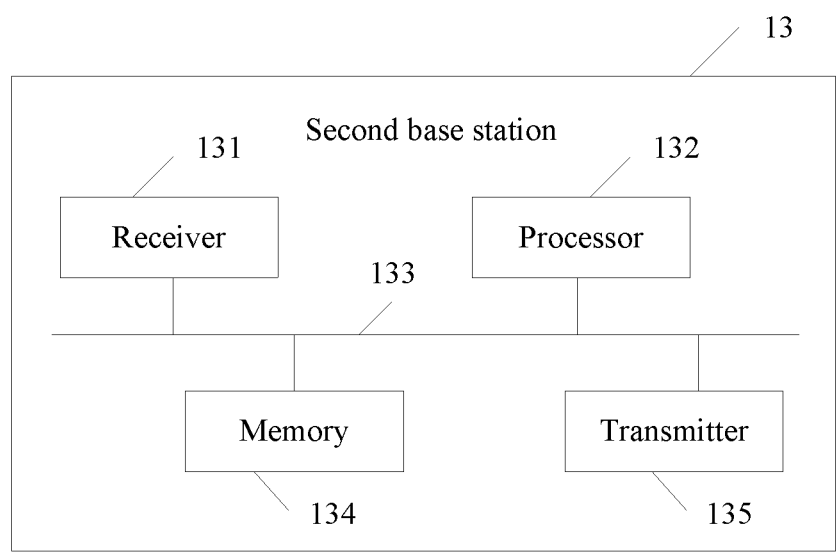
FIG. 13 is a schematic structural diagram of a second base station according to an embodiment of the present invention.

An embodiment of the present invention provides a second base station 13. As shown in FIG. 13, the second base station 13 includes a receiver 131, a processor 132, a bus 133, a memory 134, and a transmitter 135. The memory 134 is configured to store an instruction and data. The processor 132 executes the instruction to: when the second base station determines an exchange latency between the second base station and a first base station, if the exchange latency is greater than a first threshold and less than a second threshold, when air interface data sent by user equipment UE is received at any moment, buffer air interface data that is within fixed duration before the any moment. A serving cell of the UE is in a coverage area of the first base station, a coordinating cell of the UE is in a coverage area of the second base station, and the fixed duration is greater than a sum of the exchange latency plus a preset value. The receiver 131 executes the instruction to receive scheduling information sent by the first base station. The processor 132 executes the instruction to further determine whether air interface data corresponding to the scheduling information is buffered, and decode the air interface data corresponding to the scheduling information if the processor 132 determines that the air interface data corresponding to the scheduling information is buffered.

Optionally, the processor 132 executes the instruction to determine, according to a frame number and a subframe number that are corresponding to time domain information in the scheduling information, whether air interface data corresponding to the frame number and the subframe number is buffered; and decode the air interface data corresponding to the frame number and the subframe number if the processor 132 determines that the air interface data corresponding to the frame number and the subframe number is buffered.

Optionally, the transmitter 135 executes the instruction to send source bit data obtained after correct decoding to the first base station, or send bit data obtained when decoding is not completed to the first base station.

This embodiment of the present invention provides the second base station. The serving cell of the UE is in the coverage area of the first base station, and the coordinating cell of the UE is in the coverage area of the second base station. When the second base station determines the exchange latency between the second base station and the first base station, if the exchange latency is greater than the first threshold and less than the second threshold, when receiving, at any moment, the air interface data sent by the UE, the second base station buffers the air interface data that is within the fixed duration before the any moment. When the second base station receives the scheduling information sent by the first base station, the second base station determines whether the air interface data corresponding to the scheduling information is buffered, and decodes the air interface data corresponding to the scheduling information if the second base station determines that the air interface data corresponding to the scheduling information is buffered. In this way, the coordinating cell having a relatively large latency in exchange with the serving cell may buffer the received air interface data, so that for scheduling information that arrives at the coordinating cell later than the air interface data, the coordinating cell can receive uplink data of the UE according to the air interface data and the scheduling information. Therefore, the serving cell and the coordinating cell can perform joint data receiving on the UE for joint demodulation and decoding, to increase an uplink rate of the UE.

Figure 14:
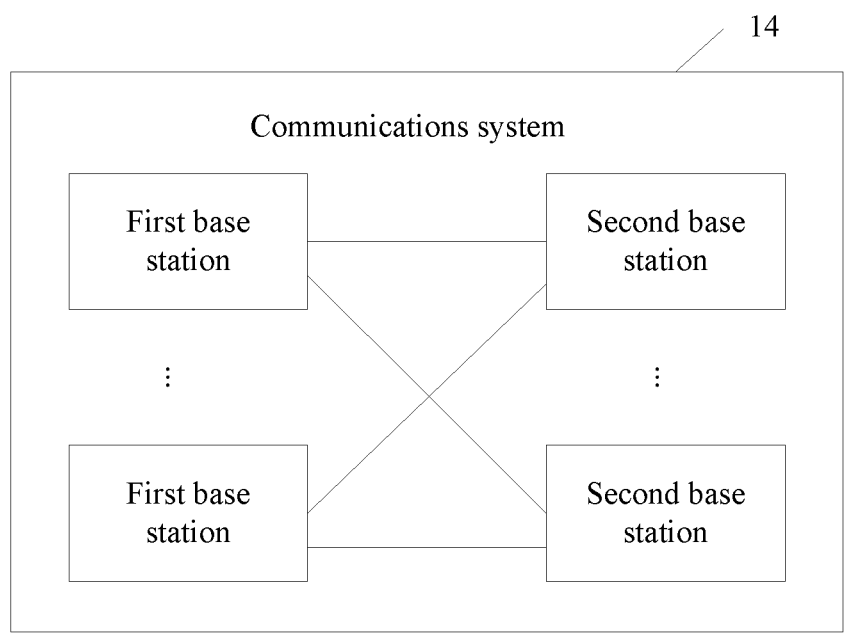
FIG. 14 is a schematic structural diagram of a communications system according to an embodiment of the present invention.

An embodiment of the present invention provides a communications system 14. As shown in FIG. 14, the communications system 14 includes a first base station and a second base station. For specific implementations of the first base station and the second base station, refer to descriptions in the embodiments shown in FIG. 1 to FIG. 13.

In the several embodiments provided in this application, it should be understood that the disclosed device and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the devices and systems in the embodiments of the present invention may be integrated into one processing unit, or each of the units may exist alone physically, or two or more units are integrated into one unit. The units may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A multi-cell uplink coordinated communication method, wherein the method comprises:
    obtaining, by a first base station, new transmission scheduling information for user equipment (UE) to transmit first data at a current scheduling moment, wherein the first base station is a base station to which a serving cell of the UE belongs;
    obtaining, by the first base station, retransmission scheduling information for the UE to retransmit the first data; and
    sending, by the first base station, the retransmission scheduling information to the second base station, wherein the second base station is a base station to which a coordinating cell of the UE belongs, and an exchange latency between the first base station and a second base station is greater than or equal to a first threshold and less than or equal to a second threshold.

2. The method according to claim 1, wherein the method further comprises:
    receiving, by the first base station, source bit data obtained after the second base station correctly decodes the first data retransmitted by the UE, and performing packaging according to the source bit data.

3. The method according to claim 1, wherein the method further comprises:
    receiving, by the first base station, first bit data obtained when the second base station does not complete decoding of the first data retransmitted by the UE, and merging, for joint demodulation and decoding, the first bit data and second bit data that is of a same type as the first bit data and that is obtained by the first base station in a process of decoding the first data.

4. The method according to claim 1, wherein the retransmission scheduling information comprises time domain information, frequency domain information, a redundancy version number, data retransmission indication information, and a modulation and coding scheme.

5. The method according to claim 4, wherein the time domain information in the retransmission scheduling information is obtained according to the following formula:

$$T = Tr \times \left\lceil \frac{Te - Ts}{Tr} \right\rceil + T0 + Ts,$$

wherein T represents the time domain information in the retransmission scheduling information, T0 represents the current scheduling moment, Te represents the exchange latency, Tr represents a preset time interval for the UE to retransmit the first data, and Ts represents a time interval from a time when the first base station completes scheduling to a time when the UE starts to send the first data.

6. A multi-cell uplink coordinated communication method, wherein the method comprises:
    receiving, by a second base station, retransmission scheduling information that is sent by a first base station and that is for first user equipment UE to retransmit first data, wherein an exchange latency between the second base station and the first base station is greater than or equal to a first threshold and less than or equal to a second threshold, the first base station is a base station to which a serving cell of the UE belongs, and the second base station is a base station to which a coordinating cell of the UE belongs;
    receiving, by the second base station, the first data retransmitted by the first UE; and
    decoding, by the second base station, the first data according to the retransmission scheduling information.

7. The method according to claim 6, wherein before the decoding, by the second base station, the first data according to the retransmission scheduling information, the method further comprises:
    if the second base station determines, according to time domain information in the retransmission scheduling information, that there is second UE to be scheduled in a subframe corresponding to the time domain information, and the second UE causes interference to the first UE, skipping, by the second base station, scheduling the second UE at a location of the subframe.

8. The method according to claim 6, wherein the method further comprises:
    sending, by the second base station, source bit data obtained after correct decoding to the first base station.

9. The method according to claim 6, wherein the method further comprises:
sending, by the second base station, bit data obtained when decoding is not completed to the first base station.

10. The method according to claim 6, wherein the retransmission scheduling information comprises time domain information, frequency domain information, a redundancy version number, data retransmission indication information, and a modulation and coding scheme.

11. An apparatus in a first base station, comprising:
at least one processor; and
a non-transitory computer-readable storage medium coupled to the at least one processor and storing programming instructions for execution by the processor, the programming instructions instruct the at least one processor to:
obtain new transmission scheduling information for user equipment (UE) to transmit first data at a current scheduling moment, wherein the first base station is a base station to which a serving cell of the UE belongs;
obtain retransmission scheduling information that is for the UE to retransmit the first data; and
send the retransmission scheduling information to the second base station, wherein the second base station is a base station to which a coordinating cell of the UE belongs, and an exchange latency between the first base station and a second base station is greater than or equal to a first threshold and less than or equal to a second threshold.

12. The apparatus according to claim 11, wherein the programming instructions further instruct the at least one processor to:
receive source bit data obtained after the second base station correctly decodes the first data retransmitted by the UE, and perform packaging according to the source bit data.

13. The apparatus according to claim 11, wherein the programming instructions further instruct the at least one processor to:
receive first bit data obtained when the second base station does not complete decoding of the first data retransmitted by the UE, and merge, for joint demodulation and decoding, the first bit data and second bit data that is of a same type as the first bit data and that is obtained in a process of decoding the first data.

14. The apparatus according to claim 11, wherein the retransmission scheduling information comprises time domain information, frequency domain information, a redundancy version number, data retransmission indication information, and a modulation and coding scheme.

15. The apparatus according to claim 14, wherein the time domain information in the retransmission scheduling information is obtained according to the following formula:

$$T = Tr \times \left\lceil \frac{Te - Ts}{Tr} \right\rceil + T0 + Ts,$$

wherein T represents the time domain information in the retransmission scheduling information, T0 represents the current scheduling moment, Te represents the exchange latency, Tr represents a preset time interval for the UE to retransmit the first data, and Ts represents a time interval from a time when the first base station completes scheduling to a time when the UE starts to send the first data.

16. An apparatus in a second base station, comprising:
at least one processor; and
a non-transitory computer-readable storage medium coupled to the at least one processor and storing programming instructions for execution by the processor, the programming instructions instruct the at least one processor to:
receive retransmission scheduling information sent by a first base station for first user equipment UE to retransmit first data, wherein an exchange latency between the second base station and the first base station is greater than or equal to a first threshold and less than or equal to a second threshold, the first base station is a base station to which a serving cell of the UE belongs, and the second base station is a base station to which a coordinating cell of the UE belongs;
receive the first data retransmitted by the first UE; and
decode the first data according to the retransmission scheduling information.

17. The apparatus according to claim 16, wherein the programming instructions further instruct the at least one processor to:
in case that there is second UE to be scheduled in a subframe corresponding to the time domain information in the retransmission scheduling information, and the second UE causes interference to the first UE, skip scheduling the second UE at a location of the subframe.

18. The apparatus according to claim 16, wherein the programming instructions further instruct the at least one processor to:
send source bit data obtained after correct decoding to the first base station.

19. The apparatus according to claim 16, wherein the programming instructions further instruct the at least one processor to:
send bit data obtained when decoding is not completed to the first base station.

20. The apparatus according to claim 16, wherein the retransmission scheduling information comprises time domain information, frequency domain information, a redundancy version number, data retransmission indication information, and a modulation and coding scheme.

* * * * *